United States Patent
Okada et al.

(10) Patent No.: US 7,435,069 B2
(45) Date of Patent: Oct. 14, 2008

(54) VULCANIZING MACHINE

(75) Inventors: Kazuto Okada, Kobe (JP); Hisashi Mitamura, Takasago (JP); Kenichi Inoue, Kobe (JP); Hideaki Kuwabara, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 898 days.

(21) Appl. No.: 10/861,571

(22) Filed: Jun. 7, 2004

(65) Prior Publication Data
US 2004/0247717 A1    Dec. 9, 2004

(30) Foreign Application Priority Data
Jun. 9, 2003 (JP) ............................. 2003-164026
Mar. 24, 2004 (JP) ............................. 2004-087857

(51) Int. Cl.
*B29C 35/02* (2006.01)
(52) U.S. Cl. .................. 425/42; 425/50; 425/174.4; 425/174.8 R
(58) Field of Classification Search ............... 425/40, 425/42, 50, 174.4, 174.8 R
See application file for complete search history.

(56) References Cited

U.S. PATENT DOCUMENTS

| | | | | |
|---|---|---|---|---|
| 2,855,629 A | * | 10/1958 | Barefoot | 425/42 |
| 3,294,606 A | * | 12/1966 | Davis et al. | 156/124 |
| 3,770,858 A | * | 11/1973 | Ireland et al. | 264/36.14 |
| 3,924,981 A | * | 12/1975 | Sarumaru | 425/42 |
| 4,545,750 A | * | 10/1985 | Sarumaru | 425/32 |
| 5,020,982 A | * | 6/1991 | Kubota et al. | 425/42 |
| 5,151,242 A | * | 9/1992 | Soeda et al. | 425/42 |
| 5,186,950 A | * | 2/1993 | Mauro et al. | 425/50 |
| 5,186,951 A | * | 2/1993 | Siegenthaler | 425/50 |
| 5,378,425 A | * | 1/1995 | Kubota et al. | 264/315 |
| 5,683,643 A | | 11/1997 | Laurent | |
| 6,474,968 B1 | | 11/2002 | Mitamura et al. | |
| 6,551,085 B1 | * | 4/2003 | Mitamura et al. | 425/35 |
| 6,620,367 B1 | | 9/2003 | Mitamura | |
| 6,655,940 B2 | | 12/2003 | Mitamura et al. | |
| 6,818,872 B2 | * | 11/2004 | Mitamura et al. | 425/40 |

FOREIGN PATENT DOCUMENTS

| | | |
|---|---|---|
| JP | 7-329066 | 6/1995 |
| KR | 2001-0050105 | 8/2000 |
| WO | WO 03/004240 A1 | 7/2002 |

* cited by examiner

*Primary Examiner*—James Mackey
(74) *Attorney, Agent, or Firm*—Reed Smith LLP; Stanley P. Fisher, Esq.; Juan Carlos A. Marques, Esq.

(57) ABSTRACT

The object of the present invention is to provide a vulcanization molding and its vulcanizing machine in which a heating pressure medium, which is nitrogen gas, is heated at high heat exchange ratio without an increase in the running cost and an increase in size. The vulcanizing machine includes a mold mechanism such as a lower side mold 5 and an upper side mold 25 and the like, which removably accommodate a green tire 4, an agitating mechanism 30, which agitates a heating pressure medium such as nitrogen gas or the like, which vulcanization mold the green tire 4 by heating the green tire 4 while pressing it against the mold mechanism, and an induction heating mechanism 41, which preferentially heats the agitating mechanism 30.

8 Claims, 16 Drawing Sheets

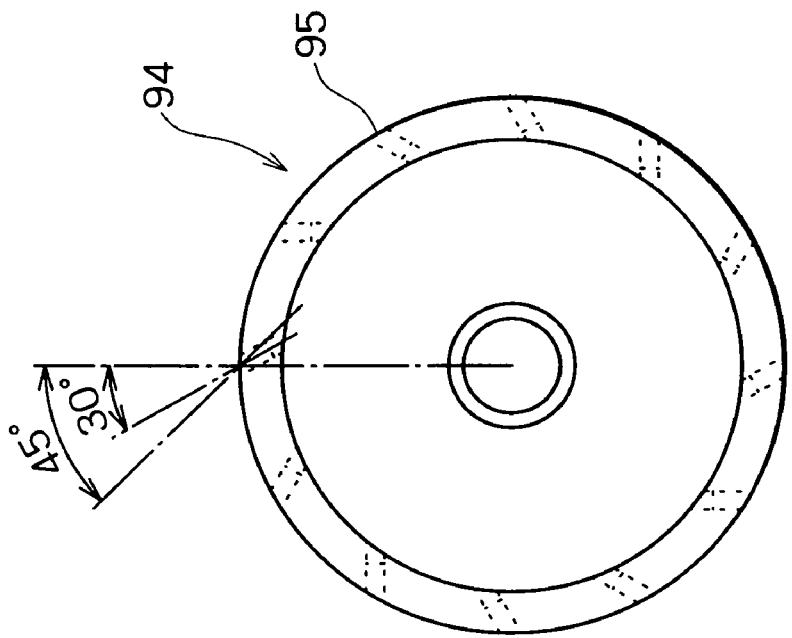
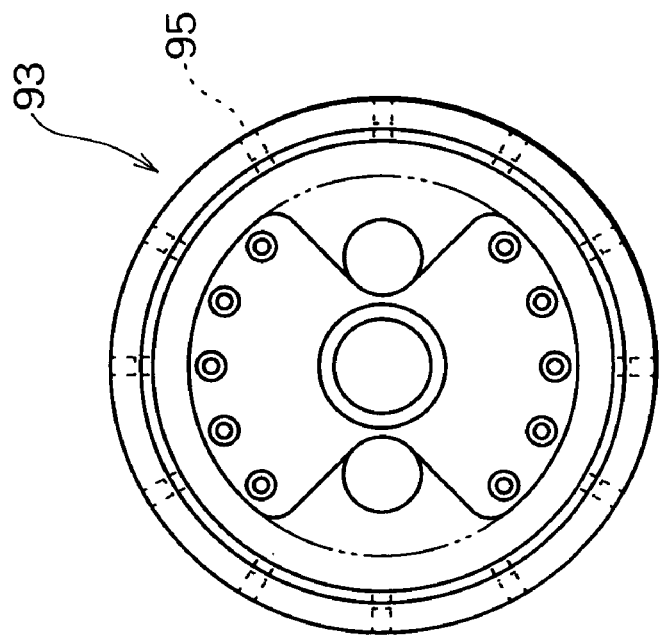

VULCANIZING MACHINE

BACKGROUND OF THE INVENTION

1. Field of the Invention

The present invention relates to a vulcanization molding method for vulcanization molding a green tire and its vulcanizing machine.

2. Description of the Related Art

In, for example, a bladder type vulcanizing machine, after a green tire is charged into a mold by mold clamping, high temperature and high pressure nitrogen gas is supplied into a bladder inserted into a tire hole to expand the bladder whereby the bladder is caused to contact an inner wall surface of the tire tightly. Then by heating the nitrogen gas with a heater disposed in an agitating passage while agitating the nitrogen gas in the green tire (in the bladder), the green tire is heated at a vulcanizing temperature through the bladder and at the same time the tire is pressed in the molding direction to perform vulcanization molding (see for example Patent Reference 1).

[Patent Reference 1] Japanese Patent Laid-Open Publication No. 7-329066.

To increase the temperature of nitrogen gas to a vulcanizing temperature for short time, it is preferable to cause nitrogen to be agitated to flow at high speed with respect to a heater so that a heat is supplied to the nitrogen gas at a high heat exchange ratio. However, in the above-mentioned conventional configuration in which nitrogen gas is heated with a heater disposed in the agitating passage, after the flow rate of nitrogen gas was lowered during agitation the nitrogen gas reaches heater. Thus, it is difficult to heat nitrogen gas at a sufficiently high heat exchange ratio. Therefore, a method of compensating a lowered part of the flow rate is considered by increasing agitation ability by an agitation mechanism for example thereby to increase the flow rate of nitrogen gas. However, in this case this method leads problems of increase of the running cost for operating the agitation mechanism and of large sizing of the agitation mechanism. Further, it is also considered to increase the diameter of the heater and to mount a fin so as to increase a contact area between the heater and nitrogen gas. However, the heat capacity of the heater is also increased and a sufficient effect cannot be obtained.

SUMMARY OF THE INVENTION

The present invention was made in considerations of the above-mentioned problems, and the object of the invention is to provide a vulcanization molding method in which a heating and pressurizing medium, which is nitrogen gas, can be heated at a high heat exchange ratio and an its vulcanizing machine with avoiding the problems of the sharp increase in the running cost and the enlargement of the agitation mechanism.

A vulcanizing machine of the present invention is characterized by comprising: a mold means for removably accommodating a green tire, a diffusion means, which diffuse a heating pressure medium for vulcanization molding said green tire by heating said green tire while pressing said green tire against said mold means, in said green tire, and a heating means for preferentially heating said diffusion means.

According to the vulcanizing machine of the present invention, since a diffusion means, which diffuses a heating pressure medium, is preferentially heated by a heating means, the temperature of the diffusion means is more rapidly increased than that of the heating pressure medium at the first stage of vulcanization molding. Thus, when the heating pressure medium is diffused by a diffusion means, the heating pressure medium and the high temperature diffusion means are brought into contact with each other at high speed whereby an amount of heat is given from the diffusion means at high efficiency. Accordingly, a green tire, which is heated by the heating pressure medium, can be vulcanization molded for a short time.

In the vulcanizing machine according to the present invention, it is preferred that said diffusion means is an agitating means for agitating said heating pressure medium. According to this vulcanizing machine, the temperature of the heating pressure medium can be increased to a vulcanizing temperature for a short time by highly efficient heat exchange by a part of high relative speed than in a case where the heating pressure medium is heated by causing the heating pressure medium to flow to a heated disposed in an agitation passage in the heating pressure medium as in a conventional case.

In the vulcanizing machine according to the present invention, it is preferred that said diffusion means is an injection means for injecting said heating pressure medium when said heating pressure medium is supplied into said tire. According to this vulcanizing machine, since the heating pressure medium is supplied into a green tire through an injection means whose temperature is increased more rapidly than in the heating pressure medium, the temperature of the heating pressure medium can be increased to a vulcanizing temperature for a short time by high efficient heat exchange.

In the vulcanizing machine according to the present invention, it is preferred that said diffusion means is partially or entirely composed of a ferromagnetic material, and said heating means has a induction heating means for electromagnetic induction heating of said diffusion means. According to this vulcanizing machine, the diffusion means is directly heated by through process on which an induction heating means electromagnetic induction heats a ferromagnetic material in the diffusion means. Accordingly, the diffusion means can be preferentially heated by a simplified configuration.

In the vulcanizing machine according to the present invention, it is preferred that said agitation means comprises: a blade assembly including a plurality of blade members, which causes said heating pressure medium to flow, in an annular manner, a blade assembly rotating means for rotating said blade assembly in the circumferential direction, and a blade supporting member, which supports said blade member in the circumferential direction, and which is composed of a ferromagnetic material. According to this vulcanizing machine, an agitation means having high strength can be obtained by a simplified configuration and the temperature of the entire blade assembly can be easily increased by electromagnetic induction heating of the blade supporting member.

In the vulcanizing machine according to the present invention, it is preferred that said agitation means comprises: a blade assembly including a plurality of blade members, which causes said heating pressure medium to flow, in an annular manner, a blade assembly rotating means for rotating said blade assembly in the circumferential direction, and a blade supporting member, which supports said blade member in the circumferential direction, and that said blade member and said blade supporting member are formed by spray coating said ferromagnetic material on a base material consisting of a high thermal conductive material. According to this vulcanizing machine, even if it has a complicated shape an agitation means can be easily obtained. Further, the high thermal conductivity blade member generates heat high efficiently with a ferromagnetic material member to hold a large efficient thermal conducting area whereby the heating pressure medium can be heated efficiently.

In the vulcanizing machine according to the present invention, it is preferred that said blade supporting member is provided with slits so that the distribution of temperature due to induction heating is homogenized. According to this vulcanizing machine, a distribution of temperature of the agitation means can be homogenized and an amount of charged heat can be further increased.

In the vulcanizing machine according to the present invention, it is preferred that said heating means has a heater buried in said agitation means. According to this vulcanizing machine, the agitation means can be easily formed by use of a general heater.

In the vulcanizing machine according to the present invention, it is preferred that said heating means has a lamp, which emits heat to said agitation means. According to this vulcanizing machine, the agitation means can be easily formed by use of a general lamp.

A vulcanizing machine is characterized by comprising: a mold means for removably accommodating a green tire, a medium accommodating means for previously heating a heating pressure medium, which vulcanization molding said green tire while accommodating said heating pressure medium so that it can be supplied to said green tire by heating said green tire while pressing said green tire onto said mold means, a hot and cold heat separating means for taking out a high temperature component of said heating pressure medium by utilizing pressure energy of the heating pressure medium, which is discharged after said vulcanization molding, and a heat exchanger, which exchange the heating pressure medium, which is replenished to said medium accommodating means through exchanging its heat by said high temperature component.

According to this vulcanizing machine of the present invention, since a high temperature component in the heating pressure medium, which is discharged after said vulcanization molding, can be utilized for preheating of the heating pressure medium, the thermal utilization efficiency can be enhanced.

A vulcanizing machine according to present invention is characterized by comprising: a mold means for removably accommodating a green tire, a medium accommodating means for preheating a heating pressure medium, which vulcanization molding means said green tire while accommodating said heating pressure medium so that it can be supplied to said green tire by heating said green tire while pressing said green tire onto said mold means, a hot and cold heat separating means for taking high temperature component in said heating pressure medium by utilizing pressure energy of the heating pressure medium, which is discharged after said vulcanization molding, a heat exchanger, which exchange the heating pressure medium, which is replenished to said medium accommodating means, and a heat insulating compression means provided in said medium accommodating means for heat insulating and compressing said heating pressure medium.

According to this vulcanizing machine of the present invention, at the preheating and at the first stage of the vulcanization molding, the heating pressure medium is heat insulation compressed by a heat insulating compression means. Thus the temperature of the heating pressure medium can be more speedily increased.

In the vulcanizing machine according to the present invention, it is preferred that said medium accommodating means is provided with a flow rate control means, provided in an upper stream of said heat insulating compression means, for increasing or decreasing the flow rate of said heating pressure means, which flows into said heat insulating compression means by controlling an opening degree. According to this vulcanizing machine, since the flow rate control means acts as a role of a constriction, an effect of temperature increase by the heat insulating compression means can be made remarkable.

In the vulcanizing machine according to the present invention, it is preferred that the opening degree of said flow rate control means and power of said heat insulating compression means are controlled so that the difference of pressure between the upstream side and downstream side of said heat insulating compression means reaches a set differential pressure. According to this vulcanizing machine, at the preheating and at the first stage of the vulcanization molding, the flow rate control means and the heat insulating compression means are operated so as to maintain a set differential pressure. Thus the temperature of the heating pressure medium can be increased.

In the vulcanizing machine according to the present invention, it is preferred that a charge amount of high pressure heating pressure medium, which is replenished to said medium accommodating means through said heat exchanger, is increased or decreased so that the pressure of said heating pressure medium, which flows in said medium accommodating means. According to this vulcanizing machine, at the vulcanization molding the charge amount of a high pressure heating pressure medium, which is replenished to the medium accommodating means can be increased or decreased so that the pressure of the heating pressure medium within the green tire can be stabilized.

In the vulcanizing machine according to the present invention, it is preferred that if the temperature in said green tire reaches a set temperature, the flow rate of said heating pressure medium supplied from said green tire to said medium accommodating means is increased, and then in the later half of vulcanization the power of said heat insulating compression means is reduced based on the reduction in the flow rate of said heating pressure medium supplied from said green tire to said medium accommodating means. According to this vulcanizing machine, at the vulcanization molding, the use of the power of the heat insulating compression means in useless heating is suppressed whereby the vulcanization time can be decreased and the running cost can be reduced.

A vulcanization molding method for vulcanization molding a green tire according to the present invention is characterized by comprising the steps of: diffusing a heating pressure medium with a diffusion mechanism and at the same time heating said heating pressure medium by an amount of heat of said diffusion mechanism itself, and heating said green tire uniformly with said heating pressure medium while pressing the green tire against a mold.

According to the vulcanization molding method of the present invention, when the heating pressure medium is diffused by the diffusion mechanism, the heating pressure medium and the diffusion mechanism are brought into contact with each other at high speed. Thus, an amount of heat of the diffusion mechanism itself is given to the heating pressure medium by high efficiency. As a result since the temperature of the heating pressure medium can be increased rapidly by high efficiency heat exchange, a green tire can be vulcanization molded for short time.

In the vulcanization molding method according to the present invention, it is preferred that said diffusion mechanism is an agitation mechanism, which agitates said heating pressure medium. According to this vulcanizing molding method, the heating pressure medium can be diffused into the green tire thoroughly.

In the vulcanization molding method according to the present invention, it is preferred that said diffusion mechanism is an injection mechanism, which injects said heating pressure medium when it is supplied into said green tire. According to this vulcanization molding method, the heating pressure medium can be diffused into the green tire thoroughly.

In the vulcanizing machine according to the present invention, it is preferred that said diffusion mechanism is heated by at least one or more heating form of electromagnetic induction heating, heater heating and lamp heating. According to this vulcanizing molding method, the temperature of the diffusion mechanism can be increased by the most suitable heating process in accordance with the structure of the diffusion mechanism itself and the configuration of the peripheral equipment by means of selection and combination of various heating form.

A vulcanization molding method according to the present invention is characterized by comprising the steps of: preheating a heating pressure medium while accommodating it to a medium accommodating mechanism so that it can be supplied to said green tire, vulcanization molding said green tire by supplying the previously heated heating pressure medium to said green tire to heat said green tire homogeneously while pressing the green tire against a mold, taking out a high temperature component in said heating pressure medium with a hot and cold heat separating mechanism by utilizing pressure energy of the heating pressure medium, which is discharged after said vulcanization molding, and heat exchanging the heating pressure medium, which is replenished to said medium accommodating mechanism, with said high temperature component to heat.

According to the vulcanization molding method of the present invention, since a high temperature component of the heating pressure medium, which is discharged after said vulcanization molding, can be utilized for preheating of the heating pressure medium, the thermal utilization efficiency can be enhanced.

A vulcanization molding method according to the present invention is characterized by comprising the steps of: circulating a heating pressure medium in a medium accommodating mechanism with a heat insulating compression mechanism, increasing or decreasing the pressure of said heating pressure medium with a flow rate control mechanism so that the difference of pressure between the upstream side and downstream side of said heat insulating compression means reaches a set differential pressure, to preheating said heating pressure medium while it can be supplied to a green tire, vulcanization molding said green tire by supplying the preheated heating pressure medium to said green tire, taking out a high temperature component in said heating pressure medium with a hot and cold heat separating mechanism by utilizing pressure energy of the heating pressure medium, which is discharged after said vulcanization molding, and heat exchanging the heating pressure medium, which is replenished to said medium accommodating means, with said high temperature component to heat.

According to the vulcanization molding method of the present invention, since the flow rate control mechanism and the heat insulating compression mechanism are operated so as to maintain a set differential pressure, the temperature of the heating pressure medium can be increased speedily.

In the vulcanization molding method of the present invention, it is preferred that a charge amount of high pressure heating pressure medium, which is heat exchanged and replenished to said medium accommodating mechanism, is increased or decreased so that the pressure of said heating pressure medium, which flows in said medium accommodating mechanism. According to this vulcanization molding method, at the time of the vulcanization molding a charge amount of high pressuried heating pressure medium, which is replenished to a medium accommodating mechanism, can be easily increased or decreased, and the pressure of the heating pressure medium in a green tire can be stabilized.

In the vulcanization molding method of the present invention, it is preferred that if the temperature in said green tire reaches a set temperature, the flow rate of said heating pressure medium supplied from said green tire to said medium accommodating mechanism is increased, and then in the later half of vulcanization, the power of said heat insulating compression means is reduced based on the reduction in the flow rate of said heating pressure medium supplied from said green tire to said medium accommodating mechanism. According to this vulcanization molding method, at the vulcanization molding, the use of the power of the heat insulating compression means in useless heating is suppressed whereby the vulcanization time can be decreased and the running cost can be reduced.

BRIEF DESCRIPTION OF DRAWINGS

FIG. 9 (*a*) and FIG. 9(*b*) are plan views showing the principal portions of a plate;

DESCRIPTION OF THE PREFERRED EMBODIMENTS

Figure 1:
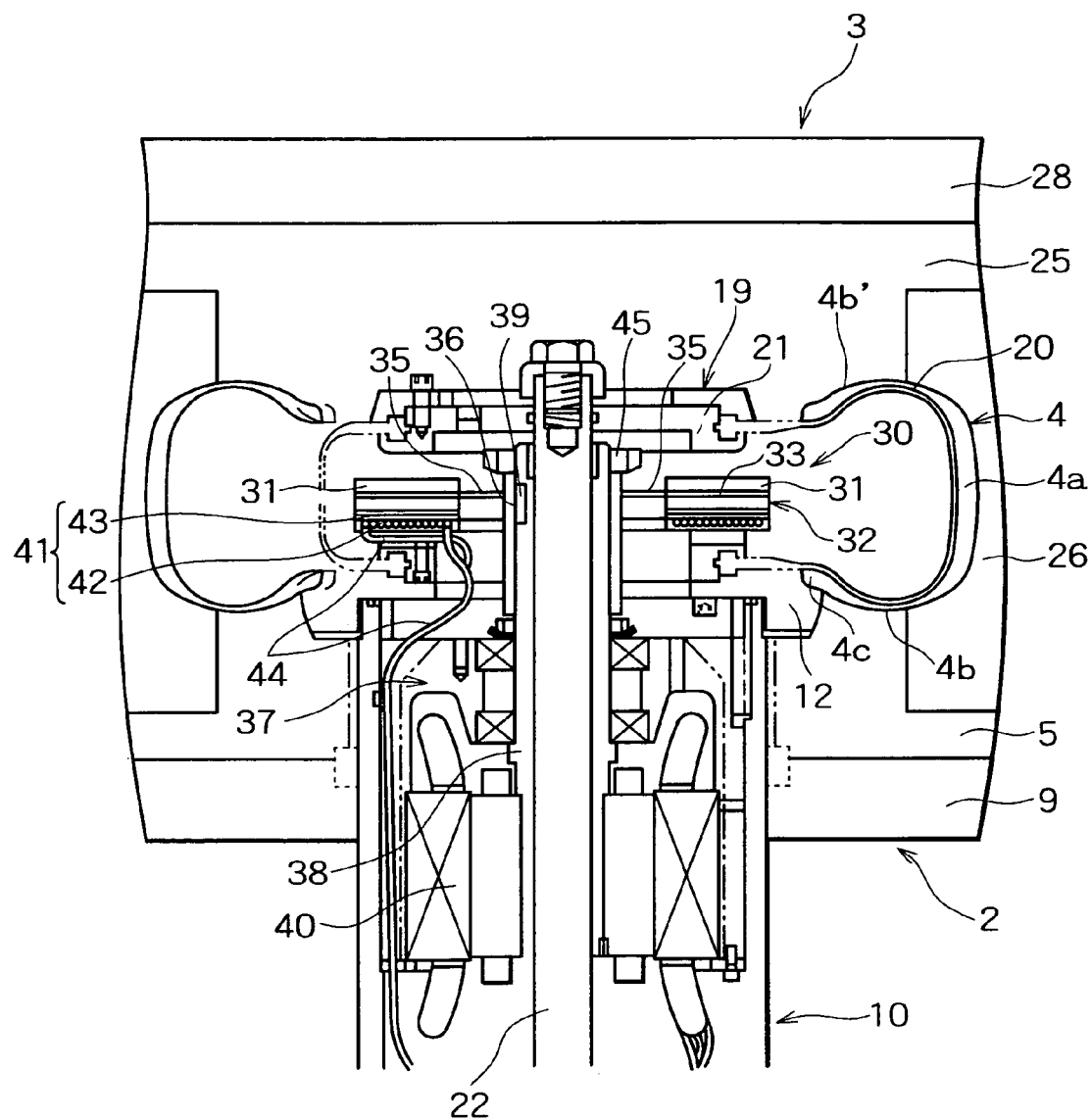
FIG. 1 is a schematic diagram showing the principal portion of a vulcanizing machine according to a first embodiment.

A vulcanization molding method and its vulcanizing machine according to the present invention will be described based on FIGS. 1 to 21.

First Embodiment

A vulcanizing machine according to a first embodiment of the present invention, includes a mold fixed portion 2 set at a predetermined level position, and a mold elevator portion 3, which ascends and descends with respect to the mold fixed portion 2. The mold elevator portion 3 includes an upper side mold 25, which abuts against an upper side wall 4b' of a green tire 4, a split mold 26 positioned in the outer peripheral direction of a tread portion 4a of the green tire 4, and an upper heating mechanism 28, which heats the upper side mold 25 at a predetermined temperature. On the other hand, the mold fixed portion 2 includes a lower side mold 5, which abuts against the lower side wall 4b of the green tire 4, a lower heating mechanism 9, which heats the lower side mold 5 at a predetermined temperature, a center mechanism 10, penetratedly provided at the center portion of the lower heating mechanism 9 and the lower side mold 5, and a base plate not shown, which supports the center mechanism 10 and the lower heating mechanism 9.

Figure 5:
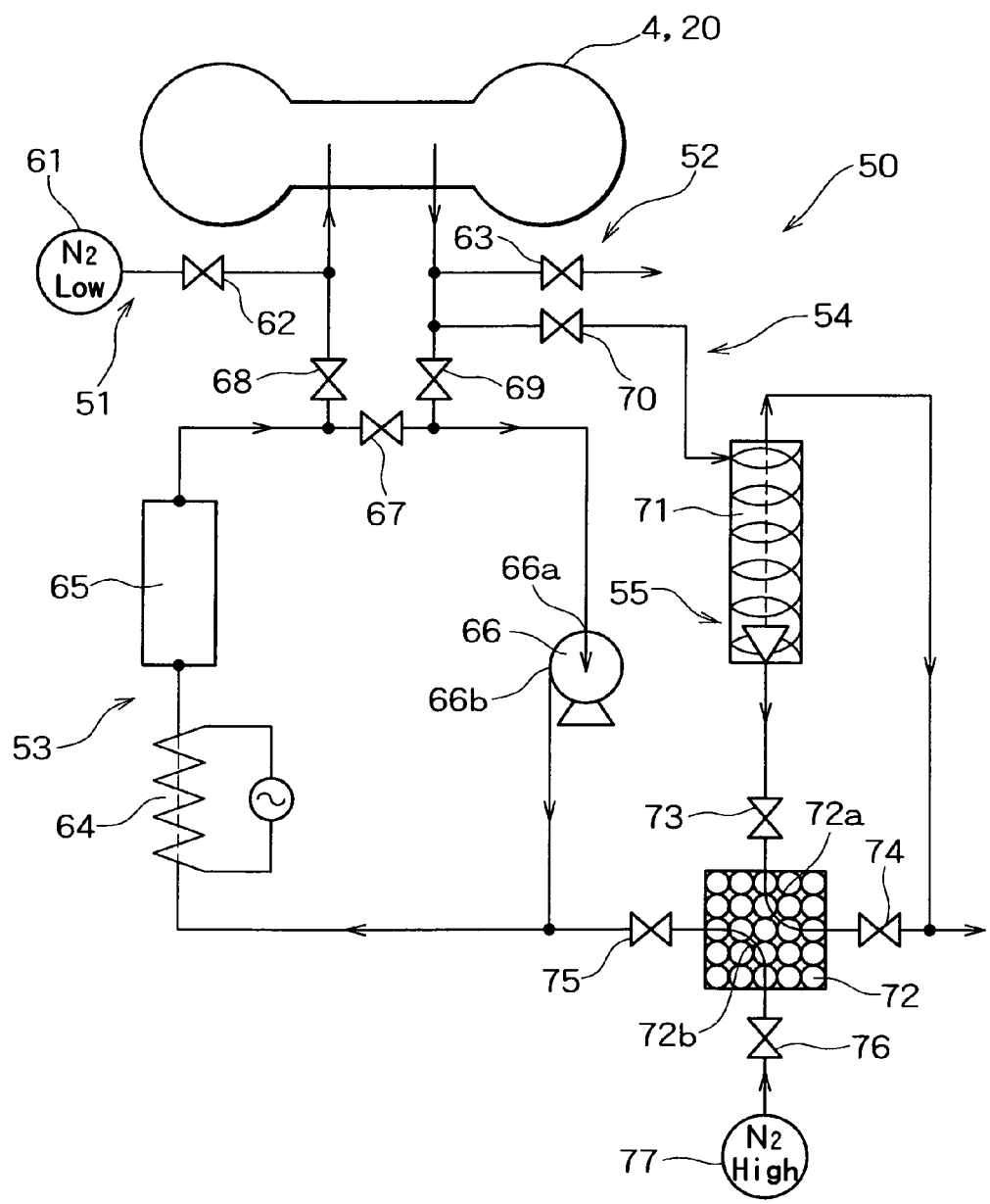
FIG. 5 is a block diagram of a gas supply device according to the first embodiment.

The above-mentioned center mechanism 10 has a lower ring 12 disposed above the lower side mold 5. The lower ring 12 is formed in such a manner that it abuts on a lower bead portion 4c of the green tire 4 and is formed so that it sandwiches the lower edge portion of a bladder 20. Further, on an inner circumferential portion of the lower ring 12 is formed a gas charge/discharge passage not shown, through which nitrogen gas, which is a heating pressure medium, is passed. The gas charge/discharge passage communicates with a gas supply device 50 as shown in FIG. 5. It is noted that the details of the gas supply device will be described later.

Further, a center post 22 is vertically disposed at the center portion of the lower ring 12 slidably in the vertical direction and in an air-tight condition. On the upper end portion of the center post 22 is provided an upper ring 19. The upper ring 19 has an upper bladder ring 21 and the upper bladder ring 21 sandwiches the upper edge portion of the bladder 20. On the other hand, to a lower end portion of the center post 22 is connected a post elevator mechanism not shown, which can elevate or lower the center post 22 at an arbitrary level position. And the post elevator mechanism elevates the center post 22 to the upper limit position so that the diameter of the bladder 20 is set to be a smaller diameter than the diameter of a tire hole of the tire 4 and it lowers the center post 22 at the vulcanization molding of the green tire 4 so that the bladder 20 is increased to a diameter by which the bladder can be abutted against the inner wall surface of the green tire 4.

Further, the bladder 20, which is expanded or contracted by the center post 22, presses the inner wall surface of a tire in the mold direction by supply of nitrogen gas at the vulcanization molding of the green tire 4, and is composed of for example a butyl rubber. In an inner portion of the bladder 20 is provided an agitation mechanism 30, which agitates nitrogen gas supplied from a gas supply device 50. The agitation mechanism 30 is partially or entirely composed of a ferromagnetic material. It is noted that the ferromagnetic material can include a steel material, SUS 420 and the like. However, if the material is electromagnetic induction heated, it is not limited to these materials.

Figure 2:
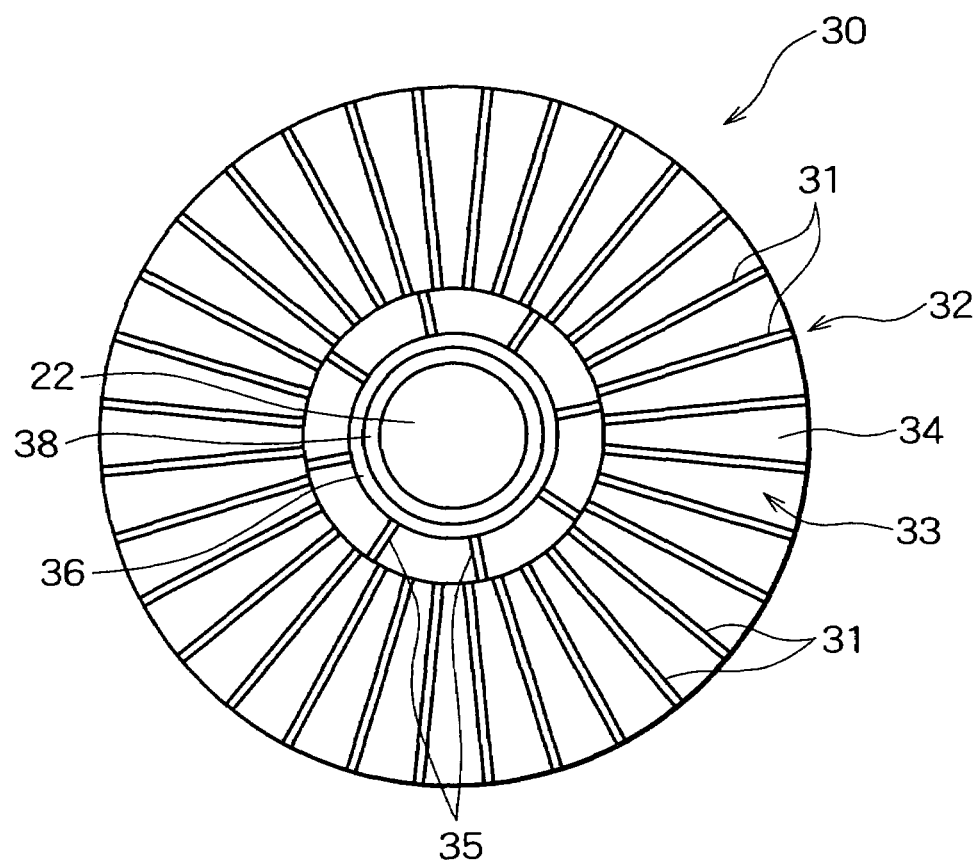
FIG. 2 is a plan view of an agitating mechanism.
Figure 3:
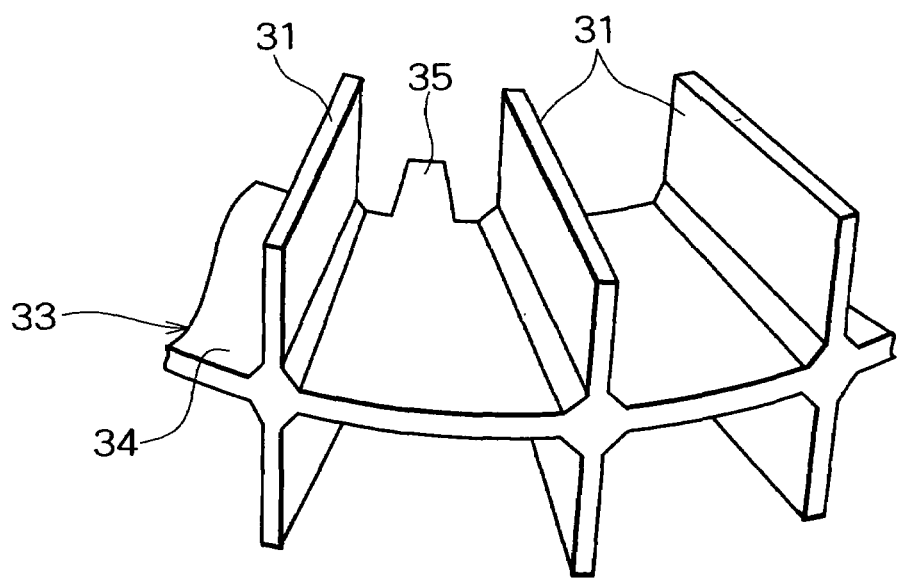
FIG. 3 is a perspective view showing the principal portion of a blade assembly.
Figure 4:
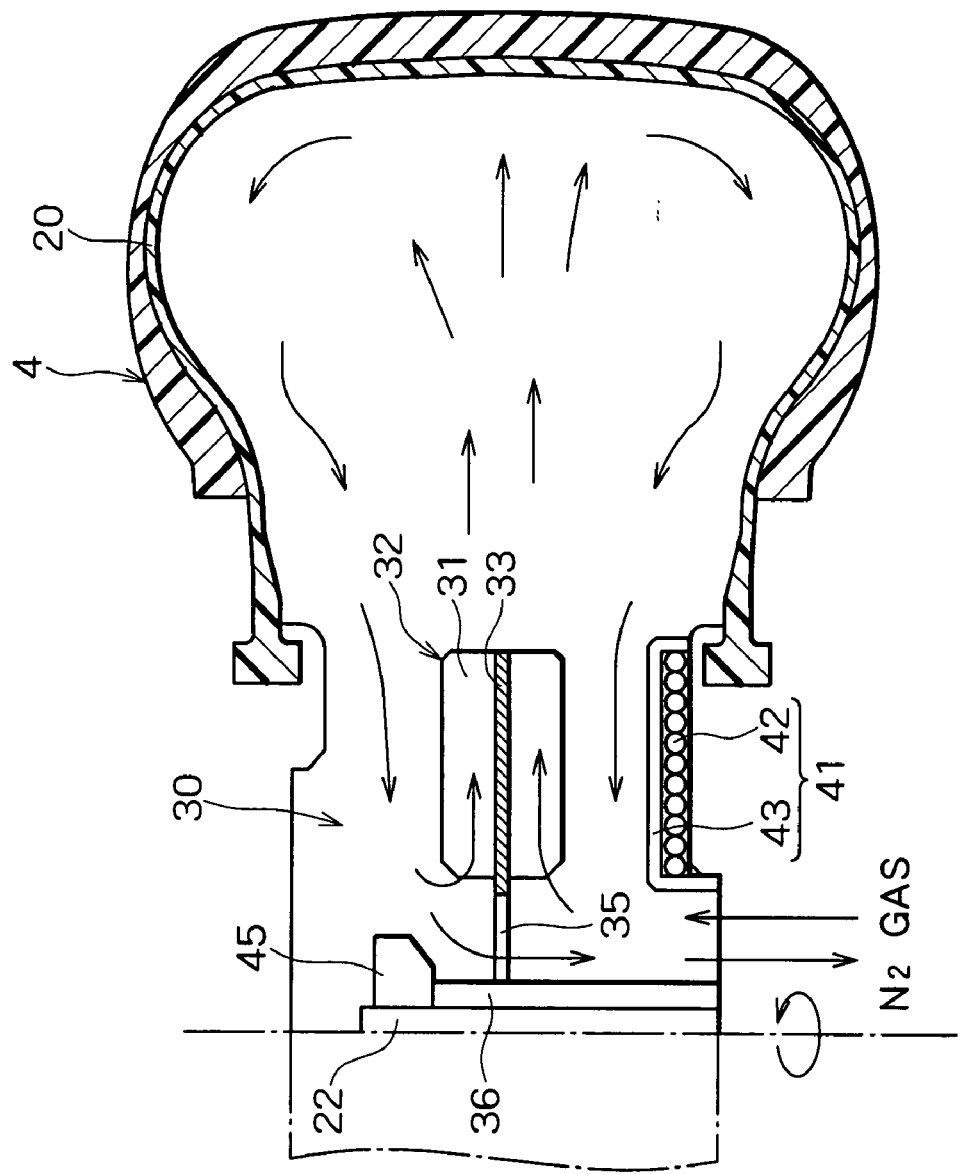
FIG. 4 is an explanatory view showing a flow of nitrogen gas at vulcanization molding.

In concrete explanations, the agitation mechanism 30 has a plurality of blade members 31, which allows nitrogen gas to flow as shown in FIGS. 2 and 3. These blade members 31 are composed of a high thermal conductive material such as copper, aluminum or the like. The blade members 31 are arranged about the axis of the center post 22 along the circumferential direction at regular intervals in an annular form, which entirely form a blade assembly 32.

The blade assembly 32 is supported by a blade supporting member 33. The blade supporting member 33 is composed of the above-mentioned ferromagnetic material. Further the blade supporting member 33 includes an annular portion 34, which supports the blade members 31 and bar-shaped supporting portions 35, protruded from the inner circumferential ends of the annular portion 34 to the direction of the center. The annular portion 34 is formed in an annular disk shape and supports the center portion in the height direction of each blade member 31. It is noted that the connection form between the annular portion 34 and the blade members 31 may be a form in which a cutout is formed in the blade member 31 and the annular portion 34, respectively, both members are fitted to each other to combine and they are joined by welding, or may be a form in which the blade member 31 is prepared while being split into two parts and the respective split pieces are joined to the upper surface and the lower surface of the annular portion 34 by welding.

On the other hand, the bar-shaped supporting portions 35 are provided at larger pitches than in the blade members 31 at regular intervals. The tip portions of the bar-shaped supporting portions 35 are connected to a first cylindrical member 36. The first cylindrical member 36 forms a part of a blade assembly rotating mechanism 37, which rotates the blade assembly 32 in the circumferential direction, as shown in FIG. 1. The blade assembly rotating mechanism 37 includes a second cylindrical member 38 rotatably fitted on the center post 22, the above-mentioned first cylindrical member 36 fitted on the upper end portion of the second cylindrical member 38, a key member 39 and a fastening member 45, which secures the first cylindrical member 36 and the second cylindrical member 38, and a rotary driving device 40, which rotation-drives the second cylindrical member 38 at a required rotational speed within the center mechanism 10. And the thus constructed blade assembly rotating mechanism 37 is adapted so as to agitate nitrogen gas in the bladder 20 in the circumferential direction mainly by rotating the blade assembly 32 through the second cylindrical member 38 and the first cylindrical member 36 by the rotary driving device 40, and induces the second flow in the directions of arrows as shown in a section of FIG. 4.

Further, as shown in FIG. 1, an induction heating mechanism 41, which preferentially heats the agitating mechanism 30, is provided under the agitating mechanism 30 while being supported on the lower ring 12. The induction heating mechanism 41 includes a coil member 42 facing the blade assembly 32 and the annular portion 34, and a heat insulation member 43 covering the upper surface of the coil member 42. The coil member 42 is formed in an annular shape about the center post 22 and is formed by winding a coil from the inner circumferential side to the outer circumferential side.

In the above-mentioned coil member 42, the respective ends of the inner circumferential side and the outer circumferential side are connected to a power source device not shown through power cables 44, 44. The power source device is capable of outputting current of high frequency. And the coil member 42 produces an alternating magnetic field by supply of high frequency current to electromagnetic induction heats the annular portion 34 by this alternating magnetic field whereby the entire agitating mechanism 30 such as the blade assembly 32 and the like is heated at high temperature. Further, the heat insulation member 43 is adapted to prevent excessive heating of the coil member 42 by radiation heat from the agitating mechanism 30.

The vulcanizing machine constructed as described above is adapted so that nitrogen gas is supplied from a gas supply device 50 as shown in FIG. 5. The gas supply device 50 includes a low pressure gas supply system 51, which supplies shaping nitrogen gas, a low pressure gas exhaust system 52, which exhausts shaping nitrogen gas, a high pressure gas preheating system 53, which preheats nitrogen gas, which is used during vulcanization molding, a high pressure gas exhaust system 54, which exhausts nitrogen gas used in vulcanization molding, and a heat recovery system 55, which heats nitrogen gas replenished to the high pressure gas preheating system 53 by utilizing the pressure energy and sensible heat of exhausted nitrogen gas.

The above-described low pressure gas supply system 51 includes a gas supply source 61 which supplies low pressure nitrogen gas, and a first valve 62 provided between the gas supply source 61 and the green tire 4. The first valve 62 is capable of switching the supply of gas from the gas supply source 61 to the green tire 4 and the stop thereof, and is opened at the shaping. Further, the low pressure gas exhaust system 52 has a second valve 63 provided between the green tire 4 and a recovery device not shown.

Further, the high pressure gas preheating system 53 includes a preheating heater 64 and a chamber 65 in a linear state and also includes a fan 66. The preheating heater 64 previously heats nitrogen gas. The chamber 65 accumulates a predetermined amount of nitrogen gas. The fan 66 takes nitrogen gas through an intake vent 66a and exhausts it through an exhaust vent 66b. In the fan 66 the intake vent 66a side communicates with the chamber 65, while the exhaust vent 66b side communicates with the preheating heater 64. Accordingly, the high pressure gas preheating system 53 is in a state where the preheating heater 64, the chamber 65 and the fan 66 are present in the circulating passage.

Further, between the intake vent 66a of the fan 66 and the chamber 65 is provided a third valve 67. To the front and rear of the third valve 67 are connected a fourth valve 68 and a fifth valve 69. The fourth valve 68 is provided between a portion between the chamber 65 and the third valve 67, and the green tire 4. The fifth valve 69 is provided between a portion between the third valve 67 and the fan 66, and the green tire 4. And in these third, fourth and fifth valves 67, 68, 69, the fourth valve 68 and the fifth valve 69 are in a closed mode and the third valve 67 is in an opened mode at the preheating so that the high pressure gas preheating system 53 is formed to be a closed circulation system. Further, at vulcanization molding, the fourth valve 68 and the fifth valve 69 are in an opened mode and the third valve 67 is in a closed mode so that the high pressure gas preheating system 53 is opened toward the green tire 4.

Further, the high pressure gas exhaust system 54 is connected to a gas recovery device not shown through the heat recovery system 55. The high pressure gas exhaust system 54 has a sixth valve 70 provided between the green tire 4 and the heat recovery system 55. When the sixth valve 70 is switched to an opened mode when vulcanization molding is finished, nitrogen gas in the green tire 4 is exhausted through the heat recovery system 55.

The heat recovery system 55 into which nitrogen gas flows from the high pressure gas exhaust system 54 as exhaust gas, includes a vortex tube 71, which separates exhaust gas (nitrogen gas) into the hot part and the cold part, and a heat exchanger 72, which heat exchanges nitrogen gas replenished to the chamber 65 in the high pressure gas preheating system 53 with the high temperature component of exhaust gas to heat the nitrogen gas. The heat exchanger 72 includes a high temperature passage 72a connected to the vortex tube 71 and a low temperature passage 72b connected to the high pressure gas preheating system 53. On the front and rear sides (upstream side and downstream side) of the high temperature passage 72a are respectively provided a seventh valve 73 and an eighth valve 74, and the eighth valve 74 is connected to a gas recovery device not shown. On the other hand, on the front and rear sides of the low temperature passage 72b are respectively provided a ninth valve 75 connected to the high pressure gas preheating system 53 and a tenth valve 76. The tenth valve 76 is connected to a gas supply source 77, which supplies high pressure nitrogen gas. And these seventh valve 73 to tenth valve 76 are changed to an opened mode when the high pressure nitrogen gas is replenished to the high pressure gas preheating system 53 from the gas supply source 77 while exhausting nitrogen gas as exhaust gas from the green tire 4. It is noted that the exhaust timing and the replenishing timing do not necessarily coincide with each other.

In the above-mentioned configuration, a vulcanization molding method will be described through an operation of the vulcanizing machine according to the first embodiment.

First, as shown in FIG. 1, by elevating the mold elevator portion 3 the mold elevator portion 3 is positioned above the mold fixed portion 2. After that by elevating the center post 22 of the center mechanism 10 the upper edge portion of the bladder 20 is elevated through the upper portion ring 19 so that the diameter of the bladder 20 is reduced to smaller than the tire hole of the green tire 4. After that the green tire 4 is transported between the mold fixed portion 2 and the mold elevator portion 3 by a transportation device not shown so that the tire hole of the green tire 4 is positioned above the center post 22. Then the green tire 4 is lowered and is held on the lower side mold 5 while inserting the center post 22 and the bladder 20 into the tire hole of the green tire 4.

Then, as shown in FIG. 5, the first valve 62 of the low pressure gas supply system 51 is opened to supply low pressure nitrogen gas from the gas supply source 61 into the bladder 20 (green tire 4). Then the bladder 20 is inflated to shape the green tire 4 and hold.

Then as shown in FIG. 1, by lowering the mold elevator portion 3 a cylindrical mold corresponding to the tread portion 4a of the green tire 4 is formed and at the same time the upper side mold 25 and the lower side mold 5 are respectively abutted on the upper portion and lower portion of this mold, whereby the mold is in a fully opened mode. Then the mold elevator portion 3 and the mold fixed portion 2 are locked by a lock holding mechanism not shown, and the locking of the mold is completed.

If the locking of the mold is completed as described above as shown in FIG. 5, the first valve 62 of the low pressure gas supply system 51 is switched to an open mode. Then the second valve 63 is in a closed mode.

After that by switching the third valve 67 in the high pressure gas preheating system 53 to an closed mode and by switching the fourth valve 68 and the fifth valve 69 to an open mode, and at the same time by switching the ninth valve 75 and the tenth valve 76 to an opened mode, nitrogen gas previously heated in the high pressure gas preheating system 53 and high pressure nitrogen gas from the gas supply source 77 are supplied to the bladder 20.

Further, the ninth valve 75 and the tenth valve 76 in the heat recovery system 55 are opened whereby high pressure nitrogen gas is caused to flow from the gas supply source 77 to the low temperature passage 72b of the heat exchanger 72. Then the high pressure nitrogen gas is heated by heat exchange with a heat accumulator heated by exhaust gas at high temperature, and then the nitrogen gas is supplied into the bladder 20. Accordingly, since the high temperature component of nitrogen gas, which is exhausted after vulcanization molding, can be utilized for preheating of replenishing nitrogen gas to be replenished, the heat utilization efficiency is enhanced. Thus, since the nitrogen gas supplied to the bladder 20 can begin heating at a preheating temperature rather close to the vulcanizing temperature, the temperature of the nitrogen gas can be increased to the vulcanizing temperature for a short time.

Further, when nitrogen gas is supplied through the high pressure gas preheating system 53 to the bladder 20, the agitating mechanism 30 and the induction heating mechanism 41 are operated as shown in FIG. 1. That is the agitating mechanism 30 is rotated by a driving force of the rotary driving device 40. Accordingly, the nitrogen gas is agitated in the circumferential direction and in the section of FIG. 4, secondary flow, which is pushed out by the blade member 31, in the outer circumferential direction, toward the tread portion 4a, is induced.

Further, in the induction heating mechanism 41 high frequency current is passed through the coil member 42. Thus, an alternating magnetic field is produced around the coil member 42. The alternating magnetic field electromagnetic induction heats the blade supporting member 33 by generating eddy current due to electromagnetic induction in the blade supporting member 33 consisting of a ferromagnetic material in the agitating mechanism 30. When the blade supporting member 33 is heated, heat of the blade supporting member 33 is rapidly conducted to the blade member 31 excellent in thermal conductivity. As a result the agitating mechanism 30 is preferentially heated by the induction heating mechanism 41 whereby the temperature of the agitating mechanism 30 is more rapidly increased than nitrogen gas at the very first stage of vulcanization molding.

Therefore, when nitrogen gas is agitated by the agitating mechanism 30, the nitrogen gas is brought into contact with high temperature agitating mechanism 30 at high speed and an amount of heat is given from the agitating mechanism 30 at high efficiency. Thus, the temperature of nitrogen gas is increased to a vulcanizing temperature by high efficient heat exchange for a short time by high speed part in the relative speed. And as the bladder 20 is expanded by the supply of nitrogen gas, the bladder 20 tightly contacts the inner wall surface of the green tire 4. Then the green tire 4 is heated while being pressed toward the direction of the mold whereby the vulcanization molding of the green tire 4 is performed.

When the vulcanization molding is completed, the fourth valve 68 and the fifth valve 69 in the high pressure gas preheating system 53 are closed and the ninth valve 75, tenth valve 76 and the third valve 67 are opened so that the high pressure gas preheating system 53 is in a closed mode. And the fan 66 and the preheating heater 64 are operated and nitrogen gas is heated and preheated while being circulated.

Further, the sixth valve 70 in the high pressure gas exhaust system 54 is opened and the valves 73 and 74 in the heat recovery system 55 communicating with this high pressure gas exhaust system 54 are opened. It is noted that the sixth valve 70 is not fully opened and exhausts for a certain time. Thus nitrogen gas in the bladder 20 is passed through the vortex tube 71 and is separated into the lower temperature component and the high temperature component. The low temperature component of nitrogen gas is exhausted as it is, and on the other hand, the high temperature component of nitrogen gas passes through the high temperature passage 72a in the heat exchanger 72 and provides heat to an accumulator in the heat exchanger 72, and then the nitrogen gas is exhausted. The heat exchanger 72 is preferably a heat accumulating heat exchanger provided with a heat accumulator. However, the heat exchanger 72 may be an indirect type of heat exchanger.

Second Embodiment

A configuration of a vulcanizing machine according to the second embodiment of the present invention will be described with reference to FIGS. 6 and 7. It is noted that the same members as in the first embodiment are denoted by the same reference numerals, and the explanation thereof will be omitted. The points that the configuration of the second embodiment is different from the configuration of the first embodiment are that in FIG. 6 a differential pressure gauge DP, which measures the difference of pressures between the upstream side and the downstream side of the fan 66, is provided and the differential pressure gauge DP controls opening degrees of the third valve 67 and the fifth valve 69, and that a pressure gauge P, which measures the pressure of nitrogen gas is provided on an upstream side of the preheating heater 64 and the pressure gauge P controls an opening degree of the tenth valve 76 and that a temperature indicator T, which measures an inside temperature of the bladder 20, is provided and the temperature indicator T controls an opening degree of the fifth valve 69.

In the above-mentioned configuration, the vulcanization molding method will be described through an operation of the vulcanizing machine according to the second embodiment.

First, the nitrogen gas, which circulates in the high pressure gas preheating system 53, is assumed to be the ideal gas. Then the following expression is satisfied.

$$PV=RT \quad \text{(Expression 1)}$$

Wherein P denotes pressure, V denotes volume, T denotes temperature and R denotes a gas constant.

Further, assuming that the internal energy of gas is U, and an amount of heat from the outside is Q, $$H=U+PV=U+RT \quad \text{(Expression 2)}$$

$$dS=dQ/T \quad \text{(Expression 3)}$$

H denote enthalpy and dS denotes specific entropy.

Figure 6:
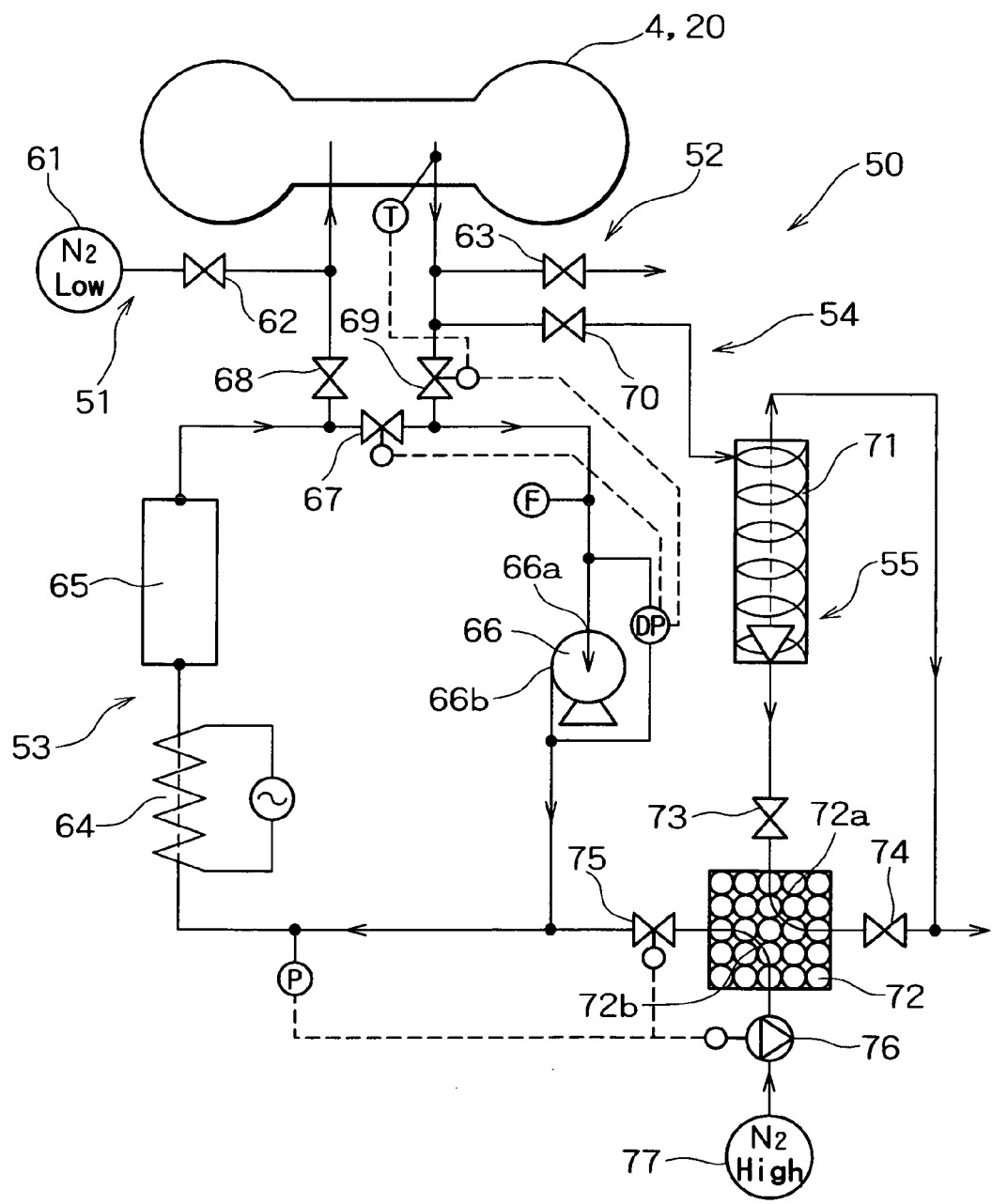
FIG. 6 is a block diagram of a gas supply device according to a second embodiment.
Figure 7:
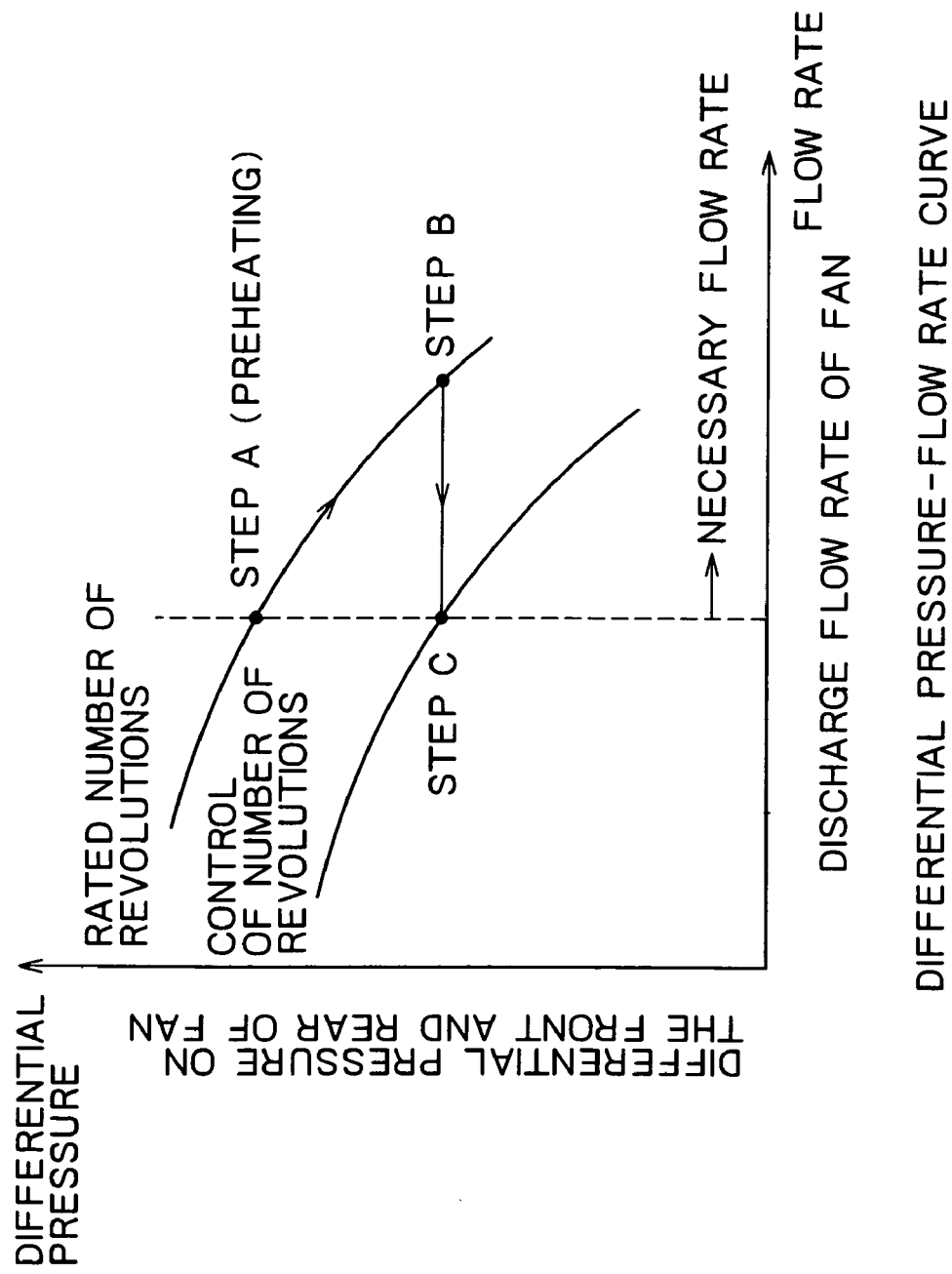
FIG. 7 is a differential pressure-flow rate curve of a fan.

In FIG. 6, at the preheating the fourth valve 68 and the fifth valve 69 are switched to a closed mode and the third valve 67 is maintained with a half open mode (constriction mode). The nitrogen gas is heat insulation compressed by the fan 66 and while the specific enthalpy of (expression 3) is maintained constant the volume of nitrogen gas is compressed to increase the pressure. Then the temperature of nitrogen gas is increased by the increase in the pressure (see (expression 1)). Then the nitrogen gas is equal enthalpy changed (see (expression 2) by a constriction of the third valve 67 and passes through the third valve 67 in a condition where the temperature of the nitrogen gas is maintained constant. This nitrogen gas is further increased in temperature by the fan 66 resulting in the rise of the temperature step by step. It is known that the nitrogen gas is equal enthalpy changed by a constriction phenomenon.

However, temperature loss and pressure loss are actually generated. That is the pressure of the nitrogen gas is not increased by the compression part of the volume in the fan 66, and the enthalpy is changed in the third valve 67 to lower the temperature. However, by providing a constriction in the third valve 67 the temperature rise effect of the fan 66 becomes remarkable and the temperature of nitrogen gas is increased speedily so that the nitrogen gas is previously heated to a temperature near the vulcanizing temperature.

The pressure difference between the upstream side and the downstream side of the fan 66 is measured by the differential pressure gauge DP and the difference pressure gauge DP controls the opening degree of the third valve 67 constriction so that this pressure difference becomes a set pressure difference. That is, if the temperature of nitrogen gas is low, the number of revolutions of the fan 66 is increased so as to increase the pressure difference and at the same time the opening degree of the third valve 67 is decreased whereby the differential pressure gauge DP controls the fan 66 and the third valve 67 so as to promote temperature rise of the nitrogen gas. On the other hand, if the temperature of the nitrogen gas is increased up to the temperature most suitable for vulcanization, the number of revolutions of the fan 66 is decreased so as to decrease the pressure difference and at the same time the opening degree of the third valve 67 is increased whereby the differential pressure gauge DP controls the fan 66 and the third valve 67 so as to make the temperature rise of the nitrogen gas gentle.

Further, at the beginning of vulcanization molding one of the fourth valve 68 and the fifth valve 69 is made in a half open mode (constriction), and the other is made in a fully open mode, and further the third valve 67 is made in a closed mode, whereby the temperature rise effect of the fan 66 becomes remarkable. FIG. 6 has a configuration that the fourth valve 68 is in a fully open mode and the fifth valve 69 is in a half open mode (constriction). The differential pressure gauge DP controls the fan 66 and the fifth valve 69. The fourth valve 68 may be made in a half open mode (constriction) and the fifth valve 69 may be made in a fully open mode. Further, both the fourth valve 68 and the fifth valve 69 may take a configuration of constriction.

Further, the pressure of the nitrogen gas, which circulates in the high pressure gas preheating system 53 is measured by a pressure gauge P provided on the upstream side of the preheating heater 64. And when high pressure nitrogen gas is replenished from the gas supply source 77 to the high pressure gas preheating system 53 at the vulcanization molding, an amount of replenished of the high pressure nitrogen gas is controlled by the pressure gauge P whereby a change in the pressure in the high pressure gas preheating system 53 is made gentle to maintain the pressure within the bladder 20 constant. That is, the opening degrees of the ninth valve 75 and tenth valve 76 provided on the upstream side and downstream side of the heat exchanger 72 are adjusted and at the same time a part of high pressure nitrogen gas is exhausted from the tenth valve 76, which is a three-way valve, to the outside whereby a charge amount of high temperature nitrogen gas replenished from the gas supply source 77 to the high pressure gas preheating system 53 at a constant ratio, is increased or deceased and the pressure gauge P controls the ninth valve 75 and the tenth valve 76 so as to maintain the pressure most suitable for vulcanization constant.

The temperature in the bladder 20 is measured by the temperature indicator T provided in the bladder 20. And by controlling an opening degree of the fourth valve 68, preferably the fifth valve 69 by the temperature indicator at the vulcanization molding a vulcanization state in the bladder 20 is changed. That is at the first stage (step A) of vulcanization molding the fifth valve 69 is made in a half open mode (constriction) whereby the temperature loss of nitrogen gas supplied from the bladder 20 to the high pressure gas preheating system 53 is decreased and the temperature indicator T controls the fifth valve 69 so as to increase the temperature in the bladder 20 rapidly.

Then, when the temperature of nitrogen gas reaches a value close to the threshold value (upper limit of vulcanizing temperature), the temperature indicator T controls so as to transfer to the latter stage (step B) of vulcanization molding. Specifically, the fifth valve 69 is gradually opened to the wide level so as to increase the flow rate of nitrogen gas, which is supplied to the fan 66 with the temperature indicator T and at the same time the pressure difference between the upstream side and the downstream side of the fan 66 (a value of the differential pressure gauge DP) is increased whereby a temperature rise effect due to the heat insulating compression by the fan 66 is reduced. Accordingly, a change in temperature within the bladder 20 is made gentle.

And the temperature indicator T controls so as to transfer to the final stage (step C) of vulcanization molding and the flow rate of nitrogen gas, which is supplied to the fan 66, is gradually reduced while maintaining the constant pressure difference between the upstream side and the downstream side of the fan 66. Further, the differential pressure gauge DP controls the number of revolutions of the fan 66 so as to gradually reduce it to a required value. Then the vulcanization molding is completed.

Since other points are the same as in the first embodiment, the explanation thereof will be omitted.

Third Embodiment

A configuration of vulcanizing machine according to the third embodiment of the present invention will be described with reference to FIGS. 8 and 9. It is noted that the same members as in the first embodiment are denoted by the same reference numerals, and the explanation thereof will be omitted. The points that the configuration of the third embodiment is different from the configuration of the first embodiment is that a diffusion means, which diffuses nitrogen gas in the bladder 20 is not an agitating mechanism 30 but a blow-off nozzle mechanism 90 as shown in FIG. 8.

The blow-off nozzle mechanism 90 is partially or entirely composed of a ferromagnetic material and has a construction of overlapped two hollow cylindrical disk-shaped plates 93, 94 as shown in FIGS. 9(a) and 9(b). Further, the plates 93 and 94 are provided with a plurality of nozzles 95 in the circumferential direction at regular intervals. As shown in FIG. 9(a), the nozzles 95 are oriented in directions coincident with the radial directions and the blow-off direction is an external direction of the plate 93 and is oriented slantingly with a certain angle with respect to the plane of the plate 93. Further, as shown in FIG. 9(b), the nozzle 95 may be oriented in a direction slanted by 30 degrees from a direction coincident with the radial direction. It is noted that the slant angle of the nozzle is not limited to 30 degrees but it can be set to an optional angle.

Figure 8:
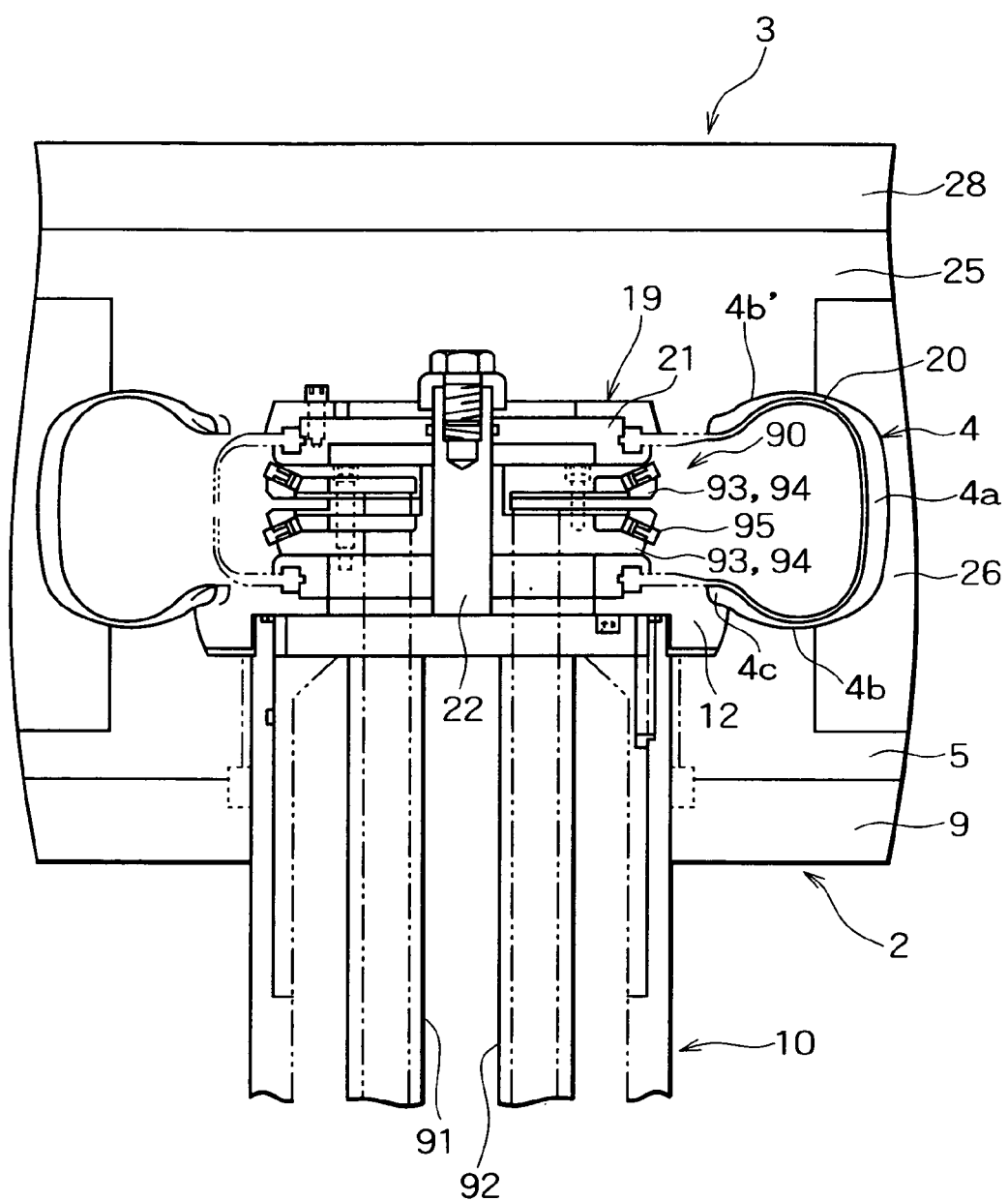
FIG. 8 is a schematic diagram showing the principal portion of a vulcanizing machine according to a third embodiment.

The blow-off nozzle mechanism 90 is positioned at the center of the bladder 20 as shown in FIG. 8, and in the overlapped two plates 93, 94, the nozzles 95 of the upper plates 93, 94 are formed to be oriented slantingly upward and the nozzles 95 of the lower plates 93, 94 are formed to be oriented slantingly downward. Accordingly, the nitrogen gas is blown off thoroughly through the plurality of nozzles 95 without the need of rotation of the diffusion means unlike the first embodiment, whereby the inside of the bladder 20 can be heated homogeneously. The combination of the upper and lower plates 93 and 94 may be the same material or different materials.

Further, according to the first embodiment, since the rotation mechanism is not needed unlike the first embodiment, the inside of the center mechanism 10 is provided with only gas supply and exhaust passages 91 and 92 through which the nitrogen gas is passed. The gas supply and exhaust passage 91 and 92 are connected to the gas supply device 50 as shown in FIG. 5 or 6. To the inside of the plates 93 and 94 is supplied the nitrogen gas through the gas supply and exhaust passages 91 and 92. Further, the center post 22 is vertically disposed at the center of the lower ring 12.

Under the blow-off nozzle mechanism 90 is provided an induction heating mechanism not shown, which preferentially heats the blow-off nozzle mechanism 90, supported by the lower ring 12. This induction heating mechanism electromagnetic induction heats the plates 93 and 94 whereby the blow-off nozzle mechanism 90 is entirely heated at high temperature.

In the above-mentioned configuration, the vulcanization molding method will be described through an operation of the vulcanizing machine according to the third embodiment.

After the green tire 4 is held on the lower side mold 5, nitrogen gas is supplied from the high pressure gas preheating system 53 through the gas supply and exhaust passages 91 and 92. Then the temperature of the blow-off nozzle mechanism 90 is increased more rapidly than the nitrogen gas by an induction heating mechanism not shown. Thus, when the nitrogen gas is blown off by the blow-off nozzle mechanism, high speed contact between the nitrogen gas and the high temperature blow-off nozzle mechanism 90 is performed and an amount of heat can be given at high efficiency through the blow-off nozzle mechanism 90. Accordingly, the temperature of the nitrogen gas is increased to the vulcanizing temperature by highly efficient heat exchange for a short time by high speed part in the relative speed. And as the bladder 20 is expanded by the supply of nitrogen gas, the bladder 20 tightly contacts the inner wall surface of the green tire 4. Then the green tire 4 is heated while being pressed toward the direction of the mold whereby the vulcanization molding of the green tire 4 is performed.

Since other points are the same as in the first embodiment, the explanation thereof will be omitted.

As described above, the vulcanization molding methods of the first to third embodiments are to vulcanization mold the tire 4 by steps of diffusing a heating pressure medium such as nitrogen gas by a diffusion means such as the agitating mechanism 30, the blow-off nozzle mechanism 90 or the like and at the same time heating the heating pressure medium at an amount of heat of the diffusion means itself, and heating the green tire 4 homogeneously by the heating pressure medium while pressing the green tire 4 against the mold. It is noted that the diffusion means such as the agitating mechanism 30, or the blow-off nozzle mechanism 90 or the like in the first to third embodiments can be heated by at least one or more heating forms such as electromagnetic induction heating, heater heating and lamp heating, and by selecting and combining various heating forms the temperature of the diffusion means can be increased by the most suitable heating method in accordance with the structure of the diffusion means itself and the configuration of peripheral equipment.

Further, to allow the performance of the above-mentioned vulcanization molding methods, as shown in FIG. 1 or FIG. 8, the vulcanizing machines according to the first to third embodiments have a configuration comprising a mold mechanism (mold means) such as the lower side mold 5, the upper side mold 25 and the like, which removably accommodates the green tire 4, a diffusion means, which diffuses a heating pressure medium such as nitrogen gas or the like, which vulcanization molds the green tire by heating the green tire 4 while pressing it against the mold mechanism, and an induction heating mechanism (heating means), which preferentially heats the diffusion means.

According to the above-mentioned configuration, the diffusion means, which diffuses the heating pressure medium such as nitrogen gas or the like, is preferentially heated by the induction heating mechanism, whereby at the first stage of the vulcanization molding, the temperature of the diffusion means is more rapidly increased than the heating pressure medium. Therefore, when the heating pressure medium is diffused by the diffusion means, the heating pressure medium is brought into contact with the high temperature diffusion means at high speed so that an amount of heat is given at high efficiency from the diffusion means. As a result the temperature of the heating pressure medium can be increased to the vulcanizing temperature by highly efficient heat exchange for a shorter time by a part of high speed contact than in the conventional case where the heating pressure medium is heated by causing it to flow in the heater disposed in an agitating passage of the heating pressure medium. Thus the green tire 4 heated by the heating pressure medium can be vulcanization molded for a short time.

It is noted that although, in the first to third embodiments, a case of adapting the vulcanizing machine in which a bladder type using the bladder 20 is adopted, is explained, it is not limited to this and the present invention may be adopted for a bladder-less type vulcanizing machine. Further, as a mold mechanism the present invention was described by use of a split mold type, in which combined mold parts are locked. However, this invention is not limited to this type, and it may be a two-piece mold type, in which an upper mold and a lower mold are locked. Further, in the embodiments of the present invention, a case where nitrogen gas was adopted as a heating pressure medium, was explained. However, this invention is not limited to this and inactive gas, air, vapor or the like other than nitrogen gas may be used.

Further, in the first to third embodiments, a part or the entire portion of the agitating mechanism 30 or the blow-off nozzle mechanism 90, which is a diffusion means, is composed of a ferromagnetic material such as a steel material, SUS 420 or the like, and the present invention has an induction heating mechanism, which electromagnetic induction heats the diffusion means. Accordingly, the induction heating mechanism electromagnetic induction heats the ferromagnetic material of the diffusion means whereby the diffusion means are directly heated. Thus, the diffusion means may be preferentially heated by a simplified configuration.

Further, in the first embodiment, the agitating mechanism 30 includes the blade assembly 32 provided with a plurality of the blade members 31 (any of a ferromagnetic material and high thermal conductive materials for example, copper, aluminum and the like may be used), which causes a heating pressure medium to flow, in an annular manner, the blade assembly rotating mechanism 37 (blade assembly rotating means), which rotates the blade assembly 32 in the circumferential direction, and the blade supporting member 33 which supports the blade member 31 in the circumferential direction composed of a ferromagnetic material. Accordingly, an agitating mechanism 30 having a simplified configuration and high strength can be obtained, and further, the temperature of the entire blade assembly 32 can be easily increased by electromagnetic heating of the blade supporting member 33.

It is noted that although the blade member 31 in the first embodiment was explained with a case using a highly thermal conductive material such as copper, or aluminum or the like, it may be composed of a ferromagnetic material. Further, the agitating mechanism 30 was explained by a case where the blade assembly 32 (thermal conductor) and the blade supporting member 33 (heating medium) for induction heating were combined with each other. However, the agitating mechanism 30 may be formed so that both of the blade assembly 32 and the blade supporting member 33 have a function of a heating medium. It is noted that as will be described later the heating medium is not limited to a case heated by electromagnetic induction heating and it may be heated by heater heating or lamp heating.

Figure 10:
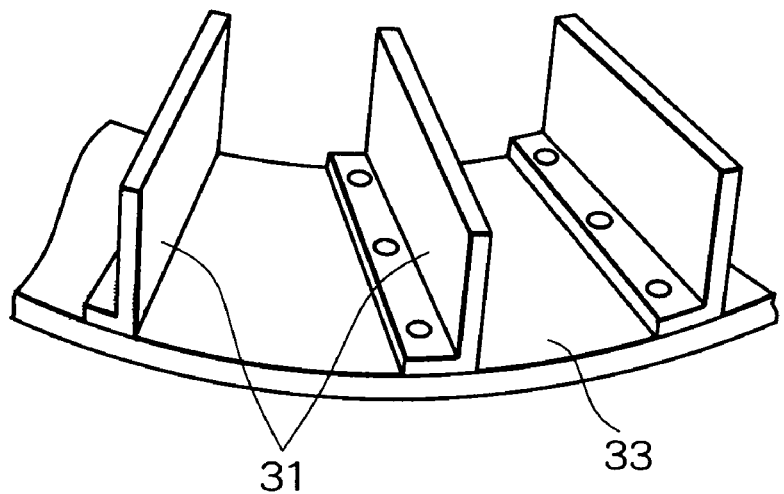
FIG. 10 is a perspective view showing the principal portion of the blade assembly.

Further, as shown in FIG. 10, the agitating mechanism 30 may be formed by securing the blade member 31 on the upper surface of the blade supporting member 33 with a fastening member such as a screw, bolt or the like. In this case the replacement of the blade member 31 can be easily performed.

Figure 11:
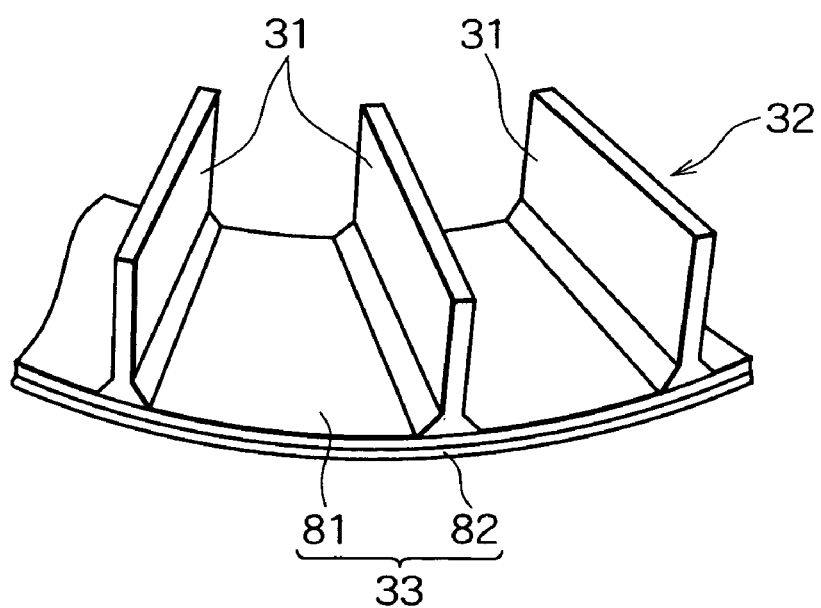
FIG. 11 is a perspective view showing the principal portion of the blade assembly.

Further, as shown in FIG. 11, the agitating mechanism 30 may take a configuration comprising the blade assembly 32 including a plurality of blade members 31, which cause the heating pressure medium to flow in an annular manner, a blade supporting member 33, which supports the blade members 31 in the circumferential direction, and that the blade supporting member 33 may have a base material 81 composed of a highly thermal conductive material and a ferromagnetic member 82 composed of a ferromagnetic material joined by fusion or riveting onto this base material 81.

Figure 12:
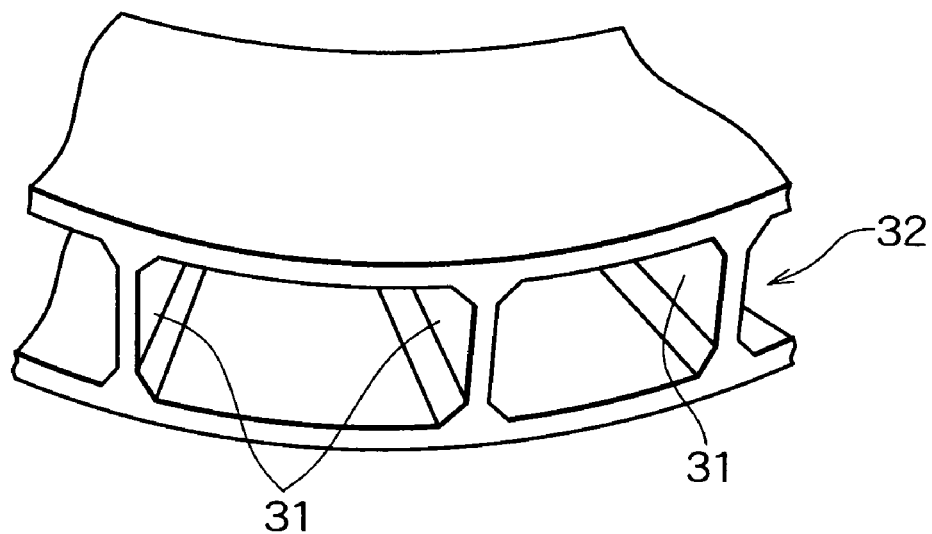
FIG. 12 is a perspective view showing the principal portion of the blade assembly.
Figure 13:
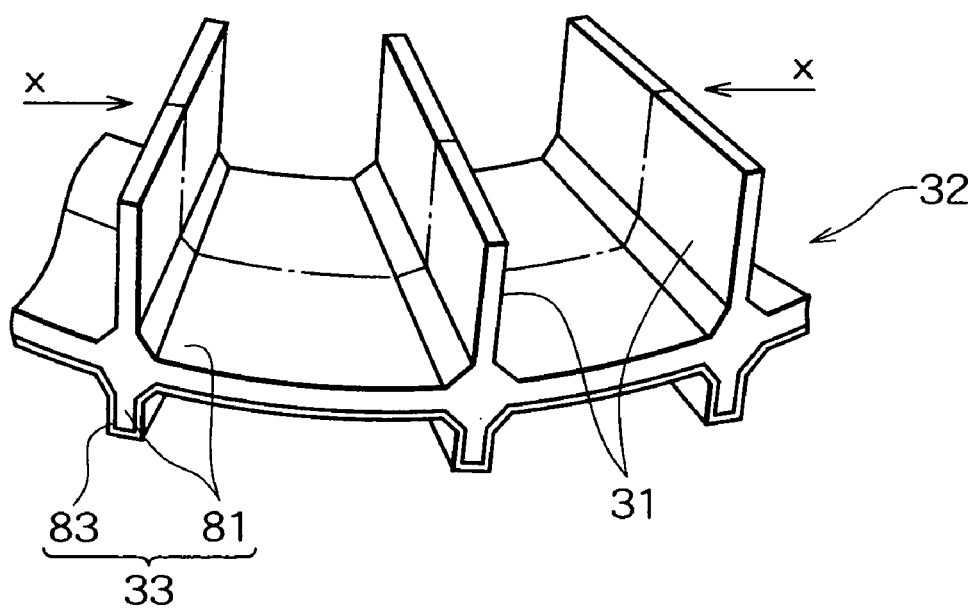
FIG. 13 is a perspective view showing the principal portion of the blade assembly.
Figure 14:
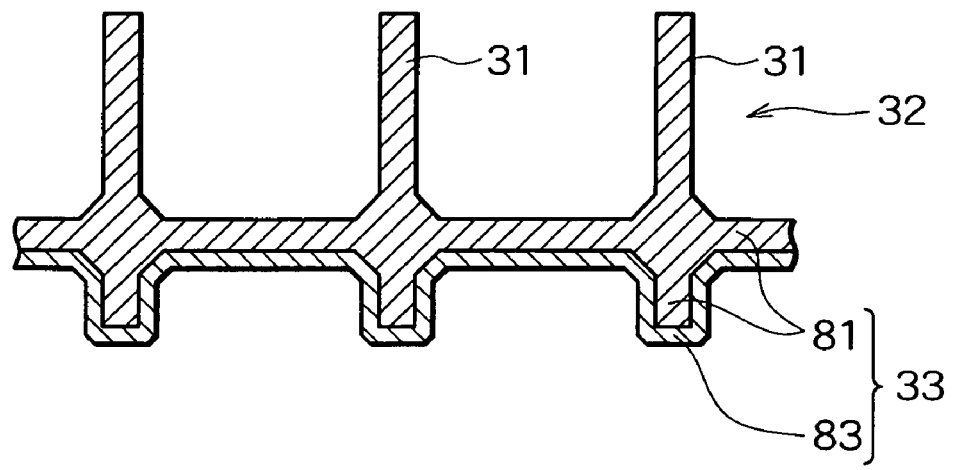
FIG. 14 is a cross-sectional view taken along line x-x of the blade assembly in FIG. 13.
Figure 15:
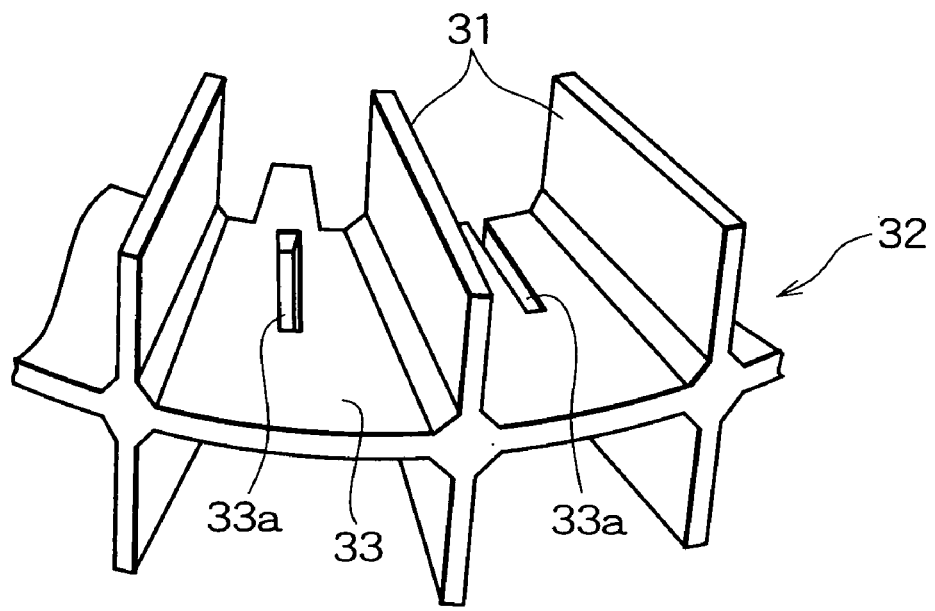
FIG. 15 is a perspective view showing the principal portion of the blade assembly.

Further, as shown in FIG. 12, the agitating mechanism 30 may take a configuration that the blade supporting member 33 is provided on an upper surface and a lower surface of the blade assembly 32. Further, the agitating mechanism 30 may take a configuration, as shown in FIGS. 13 and 14, that the blade member 31 and the blade supporting member 33 have a base material 81 composed of a highly thermal conductive material and a ferromagnetic material layer 83 formed by spraying a ferromagnetic material on this base material 81. In this case, even if the agitating means has a complicated shape, it can be easily obtained. Further, in the agitating mechanism 30 the blade supporting member 33 may be provided with a slit as shown in FIG. 15, so that the temperature distribution due to induction heating is homogenized. In this case the temperature distribution of the agitating mechanism 30 can be homogenized and the charge amount of heat can be further increased.

Figure 16:
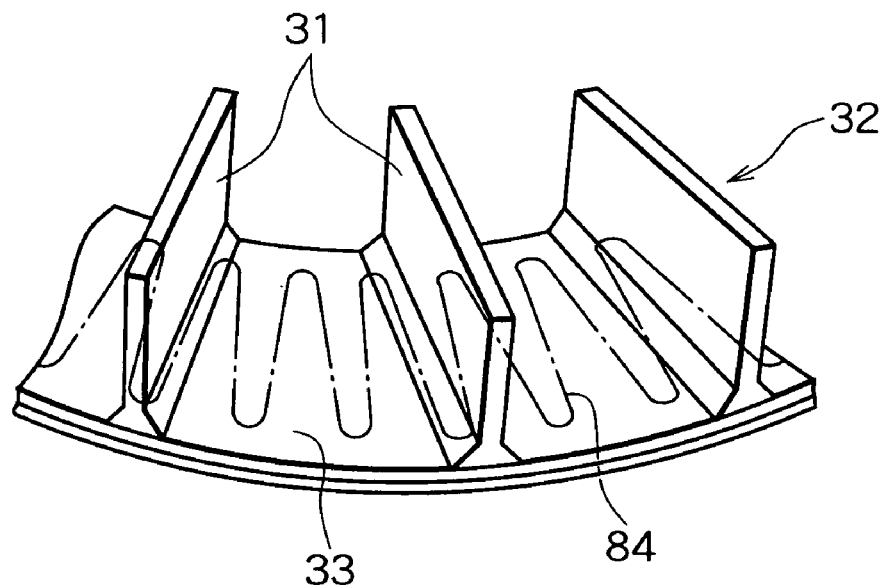
FIG. 16 is a perspective view showing the principal portion of the blade assembly.
Figure 17:
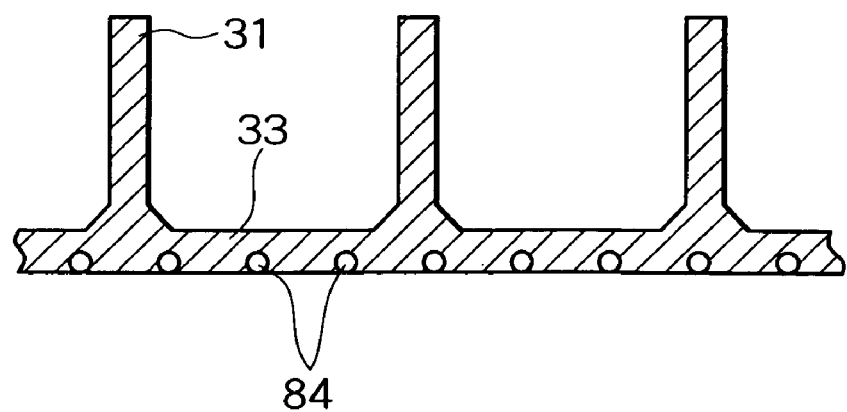
FIG. 17 is a longitudinal sectional view in FIG. 16.
Figure 18:
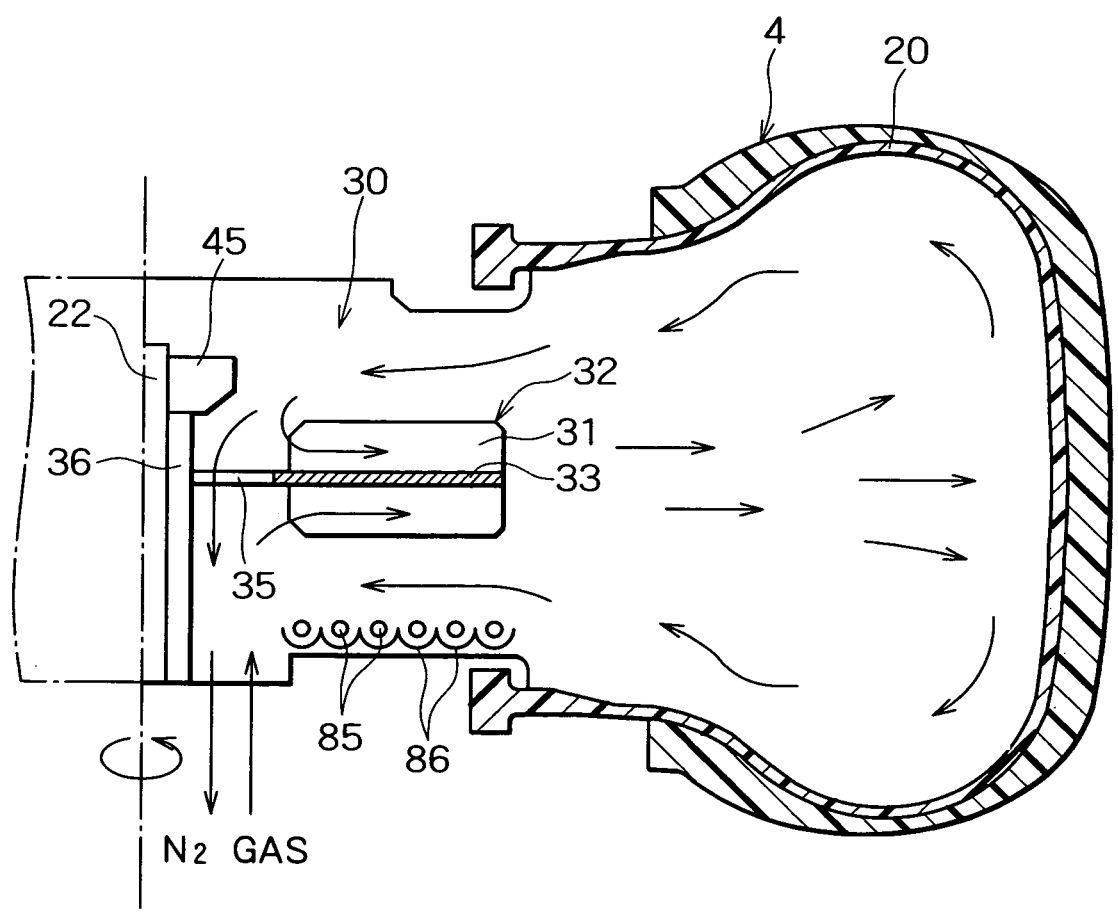
FIG. 18 is an explanatory view showing flow of nitrogen gas at the vulcanization molding.

Further, although in the first embodiment the heating mechanism using the induction heating mechanism 41 was explained, this embodiment is not limited to this. That is a vulcanizing machine may take a configuration as shown in FIGS. 16 and 17 that it includes the agitating mechanism 30 in which a sheath heater 84 is buried in the blade supporting member 33. Further, the vulcanizing machine may take a configuration as shown in FIG. 18 that it has a lamp 85, which radiates heat on the agitating mechanism 30. It is noted that a reflective plate 86 is preferably disposed under the lamp 85 so that heat radiation is collected on a required position of the blade assembly 32.

Figure 19:
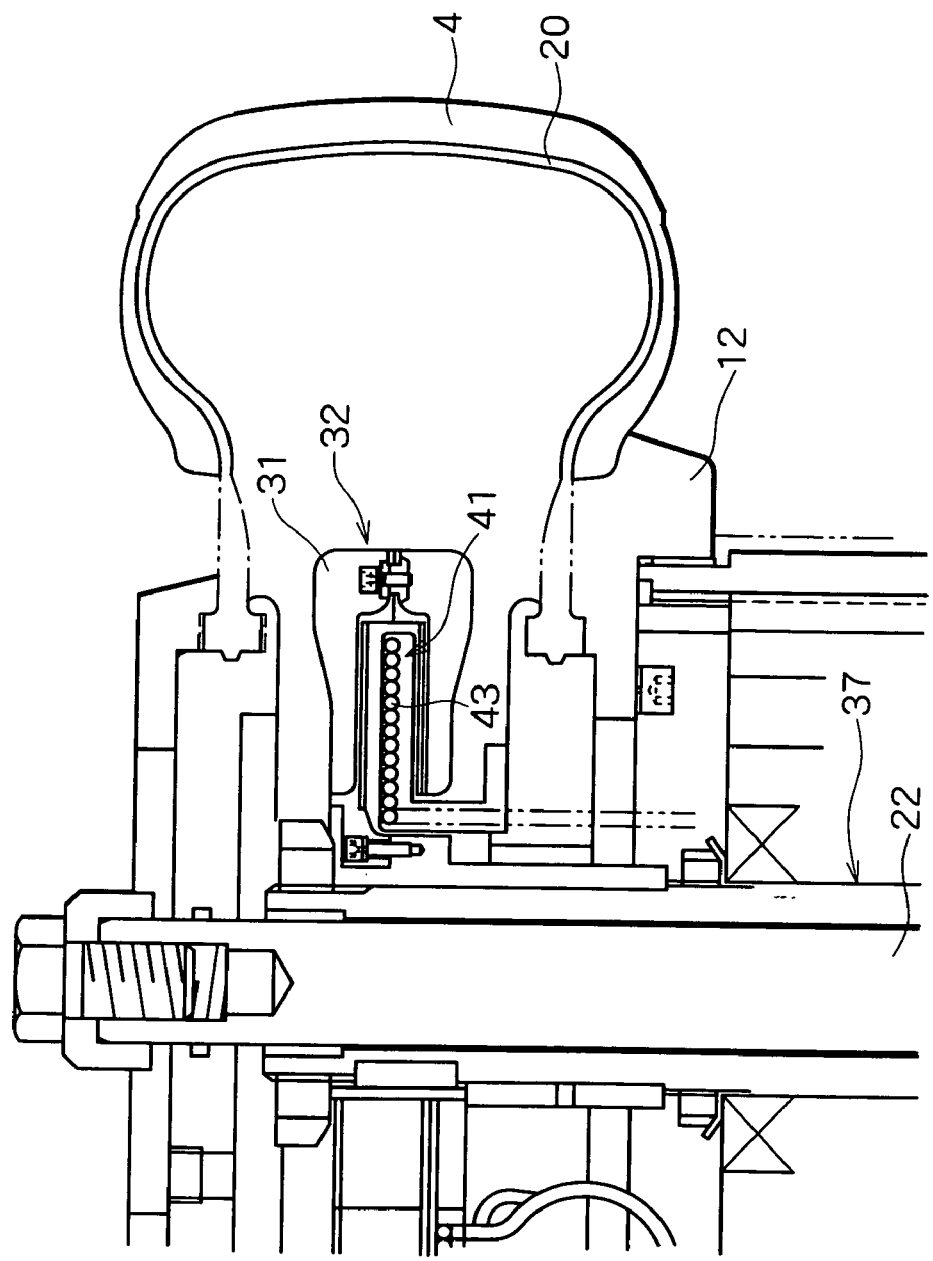
FIG. 19 is a schematic diagram showing the principal portion of the vulcanizing machine.

Further, in the first embodiment, as shown in FIG. 1, a configuration that the induction heating mechanism 41 is disposed under the blade assembly 32, was explained, this embodiment is not limited to this. That is as shown in FIG. 19, a configuration that an induction heating mechanism 41 is disposed inside the blade assembly 32 may be adopted. Further, the arrangement position of an induction heating mechanism of the third embodiment not shown is not limited to a state supported by the lower ring 12.

Further, the vulcanizing machines in the first and second embodiments each have a configuration that it comprises the high pressure gas preheating system 53 (medium accommodating means) provided with the chamber 65 or the like, which preheats a heating pressure medium such as nitrogen gas while accommodating it in the green tire 4 so as to allow the supply of the medium therein, the vortex tube 71, which takes out a high temperature component of the heating pressure medium exhausted after the vulcanization molding, and the heat exchanger 72, which heat exchanges and heats the heating pressure medium, which is replenished to the low pressure gas supply system 51 by the high temperature component of said heating pressure medium. According to this configuration since the high temperature component of the heating pressure medium exhausted after the vulcanization molding can be utilized for preheating the heating pressure medium, the heat utilization efficiency can be enhanced.

Further, in the vulcanizing machine according to the second embodiment, nitrogen gas is heat insulation compressed by the fan 66 and the specific entropy is made constant. Then the temperature of the nitrogen gas is increased by an increase in its pressure so that an equal enthalpy change is performed by the constriction of the third valve 67. Then while the temperature of the nitrogen gas is maintained, it passes through the third valve 67. Then the temperature of the nitrogen gas is further increased by the fan 66 whereby the temperature of the nitrogen gas can be increased step by step. Thus by providing constriction by the third valve 67 a temperature rise effect of the fan 66 becomes remarkable. Then the temperature of the nitrogen gas is speedily increased whereby it can be preheated to a temperature close to the vulcanizing temperature. Further, at the beginning of the vulcanization molding one of the fourth valve 68 and the fifth valve 69 is made in a half open mode (constriction) and the other is made in a fully open mode whereby the temperature rise effect of the fan 66 can be made remarkable. Further, the heating heater can be downsized.

Further, the vulcanizing machine according to the second embodiment takes a configuration that it has a differential pressure gauge DP, which measures the pressure difference between the upstream side and the downstream side of the fan 66. According to this configuration, the differential pressure gauge DP controls the opening degree of the constriction in the third valve 67 and the number of revolutions of the fan 66 so that the pressure difference between the upstream side and the downstream side of the fan 66 reaches a set differential pressure, resulting in power reduction of the fan 66.

Further, the vulcanizing machine according to the second embodiment takes a configuration that it has the pressure indicator P, which measures the pressure of nitrogen gas circulating in the high pressure gas preheating system 53. According to this configuration when high pressure nitrogen gas is replenished from the gas supply source 77 to the high pressure gas preheating system 53 at the vulcanization molding, a replenishment amount of high pressure nitrogen gas is controlled by the pressure gauge P. Thus, a change of the pressure in the high pressure gas preheating system 53 is made gentle whereby the pressure in the bladder 20 can be maintained constant.

Further, the vulcanizing machine according to the second embodiment takes a configuration that it has the temperature indicator T, which measures a temperature in the bladder 20. According to this configuration if the temperature of the nitrogen gas reaches a value close to the threshold value (upper limit of the vulcanizing temperature), the temperature indicator T controls the fifth valve 69 so as to gradually open it to the wide level, and the differential pressure gauge DP controls the number of revolutions of the fan 66 so as to gradually reduce the number to a required value whereby the power reduction of the fan 66 is attained. Thus the power of the fan 66 is prevented from being used in useless heating and a decrease in vulcanizing time and reduction in the running cost can be attained.

Figure 20:
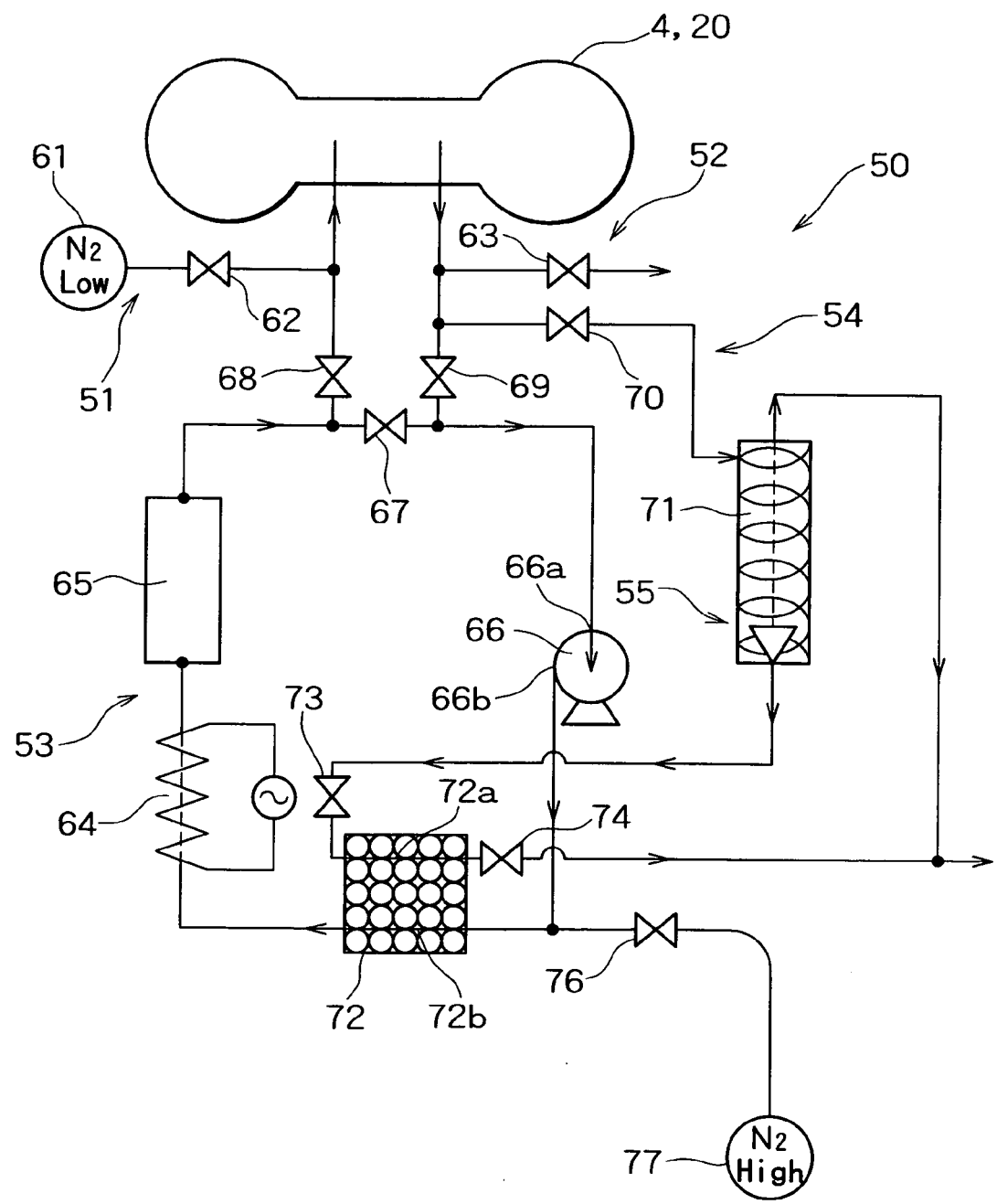
FIG. 20 is a variation view of a block diagram of a gas supply device according to the first embodiment.
Figure 21:
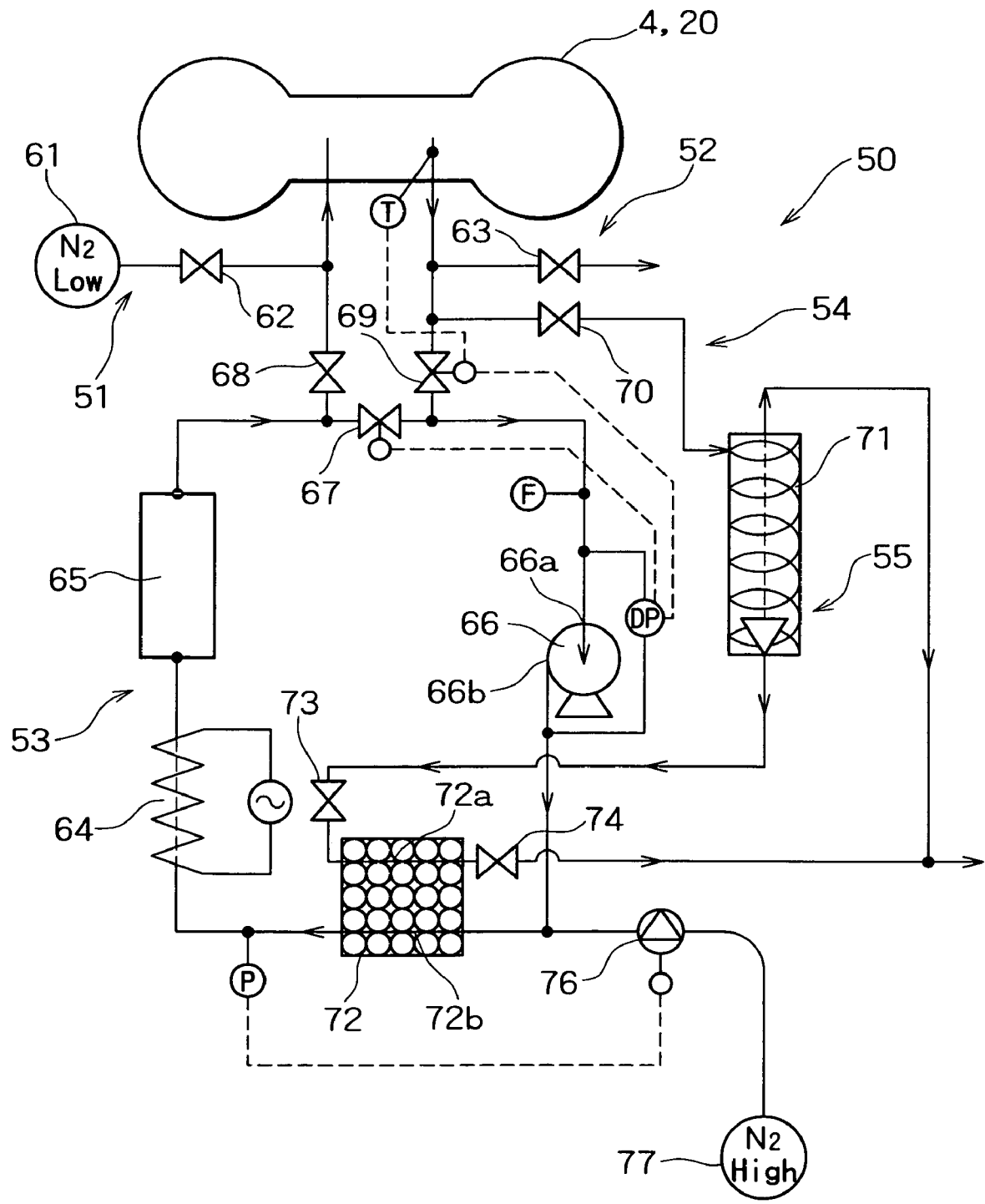
FIG. 21 is a variation view of a block diagram of a gas supply device according to the second embodiment.

It is noted that the vulcanizing machines according to the first and second embodiments may take a configuration as shown in FIG. 20 or FIG. 21, so that the heat exchanger 72 is disposed inside the high pressure gas preheating system 53 and a heating pressure medium accommodated in the high pressure gas preheating system 53 is heat exchanged and heated by the high temperature component of exhausted heating pressure medium.

It is noted that in the vulcanizing machine according to the second embodiment, an opening degree of the third valve 67 at the preheating is not limited to the configuration that it is controlled by the differential pressure gauge DP, but a configuration that it is fixed to a constant value may be used. Further, an opening degree of the fifth valve 69 at the preheating may take a configuration that it is fixed to a constant value.

Further, in the vulcanizing machine according to the second embodiment, the switching timing from the step A to the step B is not limited to the configuration that the temperature indicator T controls based on a threshold value of the temperature of nitrogen gas, but a configuration that the timing may be switched by time may be used. Further, the timing of decreasing the number of revolutions of the fan 66 in step B may be the same timing as that of widening the opening degree of the fifth valve 69, or may be the timing after a optional time has passed from the full opening of the fifth valve 69.

It is noted that the vulcanizing machine according to the second embodiment may take a configuration as shown in FIGS. 6 and 21 that a flow meter F is provided on the upstream side of the fan 66. According to this configuration, a set flow rate is provided and an opening degree of the third valve 67 or the fifth valve 69 is controlled so that the flow rate reaches the set flow rate in accordance with a measured value by the flow meter F, and the number of revolutions of the fan 66 is controlled based on the measured value of the flow rate, whereby the flow meter F can be used as a replacement of the differential pressure gauge DP and power reduction of the fan 66 can be attained.

We claim:

1. A vulcanizing machine comprising:
    mold means for removably accommodating a green tire,
    diffusion means, which diffuses a heating pressure medium for vulcanization molding said green tire by heating said green tire while pressing said green tire against said mold means, in said green tire, and
    heating means for preferentially heating said diffusion means,
    wherein said diffusion means is partially or entirely composed of a ferromagnetic material, and said heating means has an induction heating means for electromagnetic induction heating said diffusion means.

2. The vulcanizing machine according to claim 1, wherein said diffusion means is an agitating means for agitating said heating pressure medium.

3. The vulcanizing machine according to claim 1, wherein said diffusion means is an injection means for injecting said heating pressure medium when said heating pressure medium is supplied into said tire.

4. The vulcanizing machine according to claim 2, wherein said agitating means comprising:
    a blade assembly including a plurality of blade members, which cause said heating pressure medium to flow, in an annular manner,
    a blade assembly rotating means for rotating said blade assembly in the circumferential direction, and
    a blade supporting member, which supports said blade members in the circumferential direction, and which is composed of a ferromagnetic material.

5. The vulcanizing machine according to claim 2, wherein said agitating means comprises:
    a blade assembly including a plurality of blade members, which cause said heating pressure medium to flow, in an annular manner,
    a blade assembly rotating means for rotating said blade assembly in the circumferential direction, and
    a blade supporting member, which supports said blade members in the circumferential direction, and said blade members and said blade supporting member being formed by spray coating said ferromagnetic material onto a base material consisting of a thermal conductive material.

6. The vulcanizing machine according to claim 4, wherein said blade supporting member is provided with slits so that the distribution of temperature due to induction heating is homogenized.

7. The vulcanizing machine according to claim 5, wherein said blade supporting member is provided with slits so that the distribution of temperature due to induction heating is homogenized.

8. A vulcanizing machine comprising:
    a mold means for removably accommodating a green tire,
    a diffusion means, which diffuses a heating pressure medium for vulcanization molding said green tire by heating said green tire while pressing said green tire against said mold means, in said green tire, and
    a heating means for preferentially heating said diffusion means,
    wherein said diffusion means is an agitating means for agitating said heating pressure medium, and
    said heating means has a lamp, which emits heat to said agitating means.

* * * * *